United States Patent
Smith et al.

(10) Patent No.: US 12,214,978 B1
(45) Date of Patent: Feb. 4, 2025

(54) PLATFORM APPARATUSES

(71) Applicant: SLIP ROBOTICS INC., Dacula, GA (US)

(72) Inventors: Christopher Rand Smith, Dacula, GA (US); Dennis Jacob Lee Siedlak, Sandy Springs, GA (US); John Martin Jakomin, Lawrenceville, GA (US)

(73) Assignee: SLIP ROBOTICS INC., Dacula, GA (US)

( * ) Notice: Subject to any disclaimer, the term of this patent is extended or adjusted under 35 U.S.C. 154(b) by 874 days.

(21) Appl. No.: 17/224,854

(22) Filed: Apr. 7, 2021

Related U.S. Application Data

(60) Provisional application No. 63/006,620, filed on Apr. 7, 2020.

(51) Int. Cl.
| | |
|---|---|
| *B65G 67/02* | (2006.01) |
| *B60B 19/00* | (2006.01) |
| *B60K 17/34* | (2006.01) |
| *B60P 1/52* | (2006.01) |
| *B62D 63/00* | (2006.01) |
| *B65G 1/06* | (2006.01) |
| *B65G 1/10* | (2006.01) |

(52) U.S. Cl.
CPC ............ *B65G 67/02* (2013.01); *B60B 19/003* (2013.01); *B60K 17/358* (2013.01); *B60P 1/52* (2013.01); *B62D 63/00* (2013.01); *B65G 1/065* (2013.01); *B65G 1/10* (2013.01); *B60Y 2200/49* (2013.01)

(58) Field of Classification Search
CPC .......... B65G 67/02; B65G 1/065; B65G 1/10; B60B 19/003; B60K 17/358; B60P 1/52; B62D 63/00; B60Y 2200/49
See application file for complete search history.

(56) References Cited

U.S. PATENT DOCUMENTS 4,624,537 A * 11/1986 Hanssen ................ G02B 21/26
359/393
4,972,917 A * 11/1990 Matsumoto .......... G05D 1/0263
414/535

(Continued)

OTHER PUBLICATIONS

"Automated guided vehicle" Wikipedia (Year: 2019).*
"MEsh networking" Wikipedia (Year: 2019).*

*Primary Examiner* — Mark A Deuble
(74) *Attorney, Agent, or Firm* — Morris, Manning & Martin, LLP; Daniel E. Sineway, Esq.; Micah B. Hensley, Esq.

(57) ABSTRACT

In various embodiments, an automated platform may autonomously move around a site, loading dock, dock leveler, and/or trailer to transport goods. In one or more embodiments, the automated platform may be loaded with goods and, once loaded, navigate a path from a loading area onto a trailer autonomously. In some embodiments, once the automated platform is loaded onto the trailer, the automated platform may utilize hydraulics to extend legs to the ground with enough force so that the automated platform wheels are not touching the ground in the trailer, which stabilizes the automated platform while it is being hauled to a different site. In at least one embodiment, once the trailer is at the different site, the automated platform may autonomously unload itself out of the trailer and navigate over a dock leveler, through the loading dock, and to an unloading area.

23 Claims, 17 Drawing Sheets

(56) References Cited

U.S. PATENT DOCUMENTS

| | | | | | |
|---|---|---|---|---|---|
| 5,515,961 | A | * | 5/1996 | Murphy | B65G 41/008<br>198/302 |
| 5,526,890 | A | * | 6/1996 | Kadowaki | B60K 17/358<br>180/238 |
| 5,988,306 | A | * | 11/1999 | Ooishi | G05D 1/0263<br>180/24.02 |
| 7,950,478 | B2 | * | 5/2011 | Terry | B62D 55/062<br>180/9.46 |
| 7,980,335 | B2 | * | 7/2011 | Potter | B60B 19/125<br>180/7.1 |
| 8,506,232 | B2 | * | 8/2013 | Gallione | B65G 21/14<br>414/505 |
| 8,606,392 | B2 | * | 12/2013 | Wurman | G05B 19/41895<br>700/214 |
| 9,937,751 | B2 | * | 4/2018 | Boyl-Davis | B62B 3/02 |
| 10,245,945 | B2 | * | 4/2019 | Xiong | B60B 19/003 |
| 10,434,924 | B2 | * | 10/2019 | Alfaro | B60K 7/0007 |
| 10,921,819 | B2 | * | 2/2021 | Brucker | G05D 1/0244 |

* cited by examiner

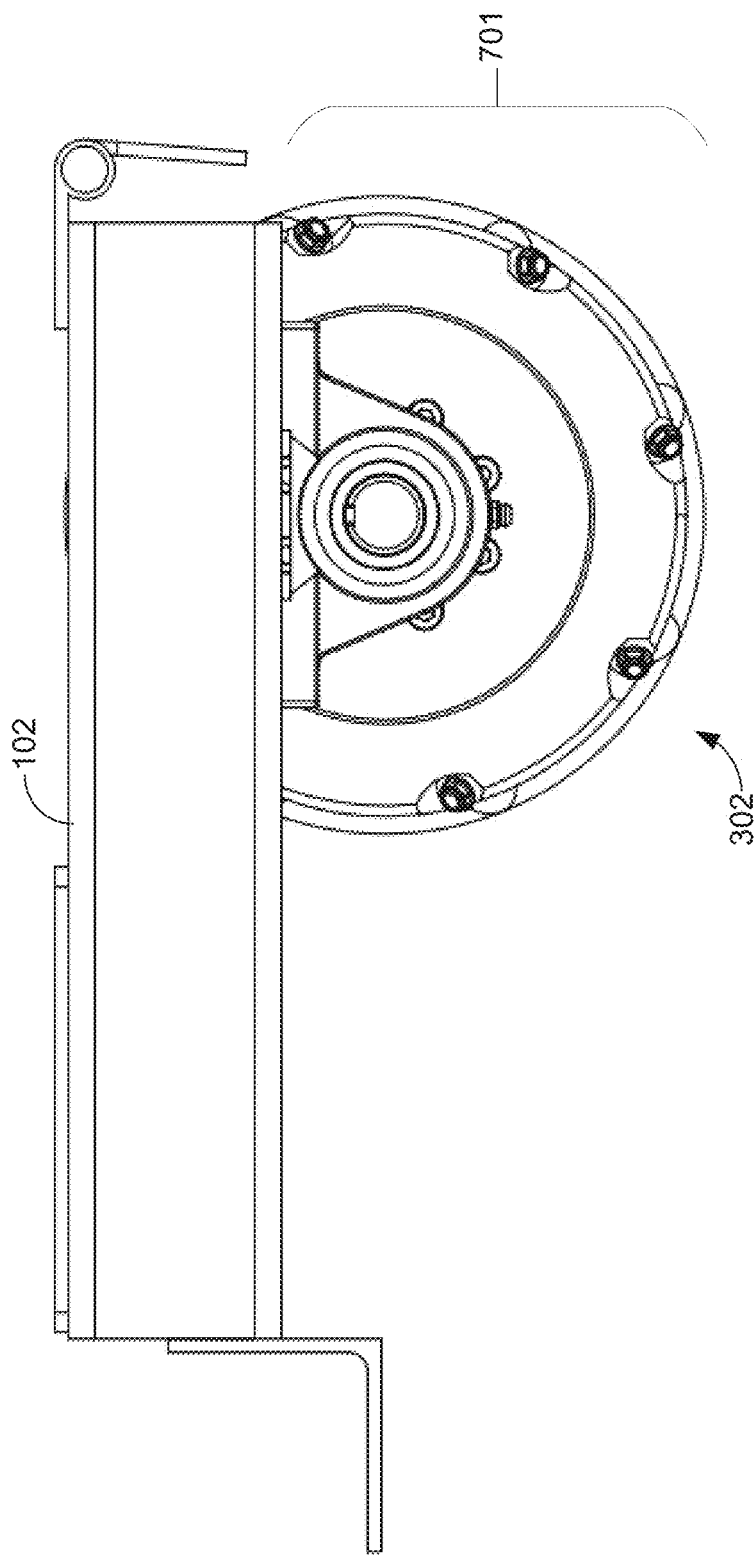

PLATFORM APPARATUSES

CROSS REFERENCE TO RELATED APPLICATIONS

This application claims the benefit of, and priority to, U.S. Provisional Patent Application. No. 63/006,620, filed on Apr. 7, 2020, and entitled "AN ELECTRO-MECHANICAL LOADING DOCK PAYLOAD MOVEMENT SYSTEM AND PLATFORM TO MOVE CONSOLIDATED PAYLOADS IN AND OUT OF SEMITRAILERS AT A LOADING DOCK AND A PROCESS FOR MOVING CONSOLIDATED PAYLOADS IN AND OUT OF SEMI-TRAILERS AT A LOADING DOCK," the disclosure of which is incorporated by reference herein in its entirety.

TECHNICAL FIELD

The present devices and apparatuses relate generally to platform-based apparatuses, and more particularly to mechanized platforms for automated loading and unloading of semi-trailers or transporting cargo.

BACKGROUND

Over 40% of trucking routes take less than two hours to drive. In these cases, the time to load and unload the truck, about thirty minutes on each end, becomes a factor in labor cost, truck driver utilization, and route lead time. The total trucking process (e.g., loading product onto a trailer, hauling the trailer to the end destination, and unloading the product) is inefficient in that, ultimately, the product is hauled by the truck for only a small portion of the total transport time, and the majority of the time consists of loading and unloading of the transport cargo into and out of the truck. The loading and unloading times being the majority of the time occurs generally because forklifts must load trucks one pallet at a time. By decreasing the amount of time needed for loading and unloading trailers, the utilization of the trailers in hauling product increases, thus increasing the efficiency of the total trucking process.

Therefore, there is a long-felt but unresolved need for an apparatus or system that improves the ability and efficiency to transport cargo and decreases the loading and unloading processes of a trailer or container at a loading dock.

BRIEF SUMMARY OF THE DISCLOSURE

Briefly described, and according to one embodiment, aspects of the present disclosure generally relate to systems and apparatuses for the utilization of a manual or automated platform to decrease the loading and unloading times for goods into and out of a trailer at a loading dock.

In various embodiments, an automated platform may autonomously move around a site, loading dock, dock leveler, and/or trailer to transport goods. In one or more embodiments, the automated platform may be loaded with goods in various containers, such as pallets, boxes, or free-standing, and, once loaded, navigate a path from a loading area onto a trailer autonomously. In some embodiments, once the automated platform is loaded onto the trailer, the automated platform may utilize hydraulics to extend legs to the ground with enough force so that the automated platform wheels are not touching the ground in the trailer, which stabilizes the automated platform while it is being hauled to a different site. In at least one embodiment, once the trailer is at the different site, the automated platform may autonomously unload itself out of the trailer and navigate over a dock leveler, through the loading dock, and to an unloading area. In one embodiment, the automated platform loading and unloading saves time and labor costs by efficiently and autonomously navigating into and out of the trailer with the goods on the automated platform.

In certain embodiments, the platform may be mechanized and can be driven via a remote control by an operator. This enables the platform to be moved in any direction or along any path as desired. In other embodiments, the platform may include software intelligence that enables automated and autonomous driving based on a set of provided instructions or parameters. For example, the platform may autonomously move from a loading dock into a shipping or trucking container, avoid any walls or edges of the container via sensors, stop at the front of the container, and then settle itself based on an understanding that the platform is safely within the container.

In multiple embodiments, the automated platform may be sized such that the automated platform, or multiple automated platforms, may fit into a trailer. In one or more embodiments, trailers have standardized lengths and widths, and standardized weight capacities that may limit the size and weight of the automated platform. In some embodiments, the hydraulic system may push an automated platform in the air so that a second automated platform may fit underneath the raised automated platform. In many embodiments, an automated platform may be stacked on another automated platform for transporting multiple automated platforms in a single trailer.

In several embodiments, the automated platform may utilize omni-directional wheels and/or omni-directional drive (e.g., wheels that can be individually rotated in place) so that the automated platform may more easily navigate through physical spaces. In at least one embodiment, the automated platform utilizes sensors to collect obstacle data that is utilized to avoid obstacles while navigating through the site.

In various embodiments, the automated platform(s) and controller(s) at a given site may communicate together to form an ad hoc local mesh network. In at least one embodiment, an automated platform transported to a site may join the ad hoc local mesh network created by the other automated platform(s) and controller(s) already at the site. In other embodiments, each site may have a local mesh network so that an automated platform at a given site can connect to the local mesh network and communicate with other automated platforms and users via controllers. In one or more embodiments, the commands may be sent from the controllers to the automated platform via the ad hoc mesh network using local private Wi-Fi, local public Wi-Fi, cellular network communications, near field communications (e.g., Bluetooth), and/or other similar communication paths. In some embodiments, users may send commands to the automated platform, such as a location to navigate to, through the local mesh network, and the automated platform may communicate with a cloud database or other automated platforms to receive mapping information for the site, speed limits for the site, and other information that the automated platform may utilize to navigate to the location.

According to one aspect, an electronic, movable platform, comprising: a generally planar platform member having an upper surface, a lower surface, and a perimeter surface that is affixed to and extends downwardly from the lower surface; a plurality of omni-directional wheel modules affixed to the lower surface of the generally planar platform member, wherein the wheel modules only partially extend beyond a lowermost edge of the perimeter surface; a motor affixed to the generally planar platform member; and a control system operatively connected to the plurality of omnidirectional wheel modules and the motor, wherein the control system provides instructions to the plurality of omnidirectional wheel modules and the motor causing the generally planar platform member to move.

According to another aspect, the platform of this aspect or any other aspect, further comprising a plurality of hydraulic legs affixed to the lower surface of the generally planar platform member, wherein the plurality of hydraulic legs are operatively connected to the control system.

According to yet another aspect, the platform of this aspect or any other aspect, wherein each of the plurality of hydraulic legs, when so instructed by the control system, extend downwardly in a hinge-like manner to contact the ground and station the platform.

According to yet another aspect, the platform of this aspect or any other aspect, further comprising one or more sensors operatively connected to the control system and configured to detect physical objects in relative proximity to the platform.

According to yet another aspect, the platform of this aspect or any other aspect, wherein the control system includes software configured to autonomously drive the platform based on readings received from the one or more sensors.

According to yet another aspect, the platform of this aspect or any other aspect, further comprising a controller maintained at a distance physically separate from the platform and operable to transmit instructions to the control system to manually control movement of the platform.

According to yet another aspect, the platform of this aspect or any other aspect, further comprising: a location tracking system embedded on or within the platform and operable to track a physical location of the platform; and a local mesh network operatively connected to the control system, wherein the local mesh network enables monitoring of locations of a plurality of platforms in a physical environment.

According to yet another aspect, the platform of this aspect or any other aspect, wherein the upper surface of the generally planar platform member is specifically sized to accommodate no more than eight pallets to be loaded thereon, wherein the eight pallets are distributed evenly across the upper surface.

According to yet another aspect, the platform of this aspect or any other aspect, wherein the plurality of omnidirectional wheel modules each include one or more mecanum wheels.

According to yet another aspect, the platform of this aspect or any other aspect, wherein the plurality of omnidirectional wheel modules each include one or more omnidirectional wheels.

According to yet another aspect, the platform of this aspect or any other aspect, wherein the generally planar platform member further comprises one or more bumpers affixed to the perimeter surface.

According to yet another aspect, the platform of this aspect or any other aspect, further including: a forklift affixed to the perimeter skirt; and one or more conveyor belts affixed to the upper surface of the generally planar platform member.

According to one aspect, an electronic, autonomous, movable platform, comprising: a rectangular planar platform member having an upper surface, a lower surface, and a perimeter skirt that is affixed to and extends downwardly from the lower surface; a plurality of omni-directional wheel modules affixed to the lower surface of the rectangular planar platform member, wherein the wheel modules only partially extend beyond a lowermost edge of the perimeter skirt; a motor affixed to the rectangular planar platform member; and a control system operatively connected to the plurality of omnidirectional wheel modules and the motor, the control system including an autonomous driving module that is configured to drive the rectangular planar platform member without instructions from a manual control, wherein the autonomous driving module provides instructions to the plurality of omnidirectional wheel modules and the motor causing the rectangular planar platform member to move autonomously.

According to another aspect, the platform of this aspect or any other aspect, further comprising a plurality of hydraulic legs affixed to the rectangular planar platform member, wherein the plurality of hydraulic legs are operatively connected to the control system and are maintained within the boundary of the perimeter skirt when in a retracted position.

According to yet another aspect, the platform of this aspect or any other aspect, wherein each of the plurality of hydraulic legs, when so instructed by the control system, extend downwardly in a hinge-like manner outside of the boundary of the perimeter skirt to contact the ground and station the platform.

According to yet another aspect, the platform of this aspect or any other aspect, further comprising one or more sensors operatively connected to the control system and configured to detect physical objects in relative proximity to the platform.

According to yet another aspect, the platform of this aspect or any other aspect, wherein the autonomous driving module is configured to autonomously drive the platform based on readings received from the one or more sensors.

According to yet another aspect, the platform of this aspect or any other aspect, further comprising a controller maintained at a distance physically separate from the platform and operable to transmit instructions to the control system to manually control movement of the platform when the platform is not in autonomous driving mode.

According to yet another aspect, the platform of this aspect or any other aspect, further comprising: a location tracking system embedded on or within the platform and operable to track a physical location of the platform; and a local mesh network operatively connected to the control system, wherein the local mesh network enables monitoring of locations of a plurality of platforms in a physical environment.

According to yet another aspect, the platform of this aspect or any other aspect, wherein the upper surface of the rectangular planar platform member is specifically sized to accommodate no more than eight pallets to be loaded thereon, wherein the eight pallets are distributed evenly across the upper surface.

According to yet another aspect, the platform of this aspect or any other aspect, wherein the plurality of omnidirectional wheel modules each include one or more mecanum wheels.

According to yet another aspect, the platform of this aspect or any other aspect, wherein the plurality of omnidirectional wheel modules each include one or more omnidirectional wheels.

According to yet another aspect, the platform of this aspect or any other aspect, wherein the rectangular planar platform member further comprises one or more bumpers affixed to the perimeter skirt.

According to yet another aspect, the platform of this aspect or any other aspect, further including: a forklift affixed to the perimeter skirt; and one or more conveyor belts affixed to the upper surface of the generally planar platform member.

According to one aspect, an electronic, movable platform, including: a generally planar platform member having an upper surface, a lower surface, and a perimeter surface that is affixed to and extends downwardly from the lower surface; a plurality of omni-directional wheel modules affixed to the lower surface of the generally planar platform member, wherein the wheel modules only partially extend beyond a lowermost edge of the perimeter surface; a motor affixed to the generally planar platform member; a control system operatively connected to the plurality of omnidirectional wheel modules and the motor, wherein the control system provides instructions to the plurality of omnidirectional wheel modules and the motor causing the generally planar platform member to move; two or more shelving units affixed to the upper surface of the generally planar platform member; and an actuator system operatively connected to the two or more shelving units, wherein the actuator system causes the two or more shelving units to translate from a first position away from a central portion of the generally planar platform member to a second position.

According to another aspect, the platform of this aspect or any other aspect, wherein the two or more shelving units form a central aisle at the central portion of the generally planar platform member in the second position.

According to yet another aspect, the platform of this aspect or any other aspect, further including tracks affixed onto the upper surface of the generally planar platform member for guiding the two or more shelving units from the first position to the second position.

According to yet another aspect, the platform of this aspect or any other aspect, further including a locking mechanism on each of the two or more shelving units, wherein the locking mechanism locks each of the two or more shelving units in the second position.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 7A illustrates a side view of an exemplary wheel system of an automated platform, according to one embodiment of the present disclosure;

DETAILED DESCRIPTION

Figure 1:
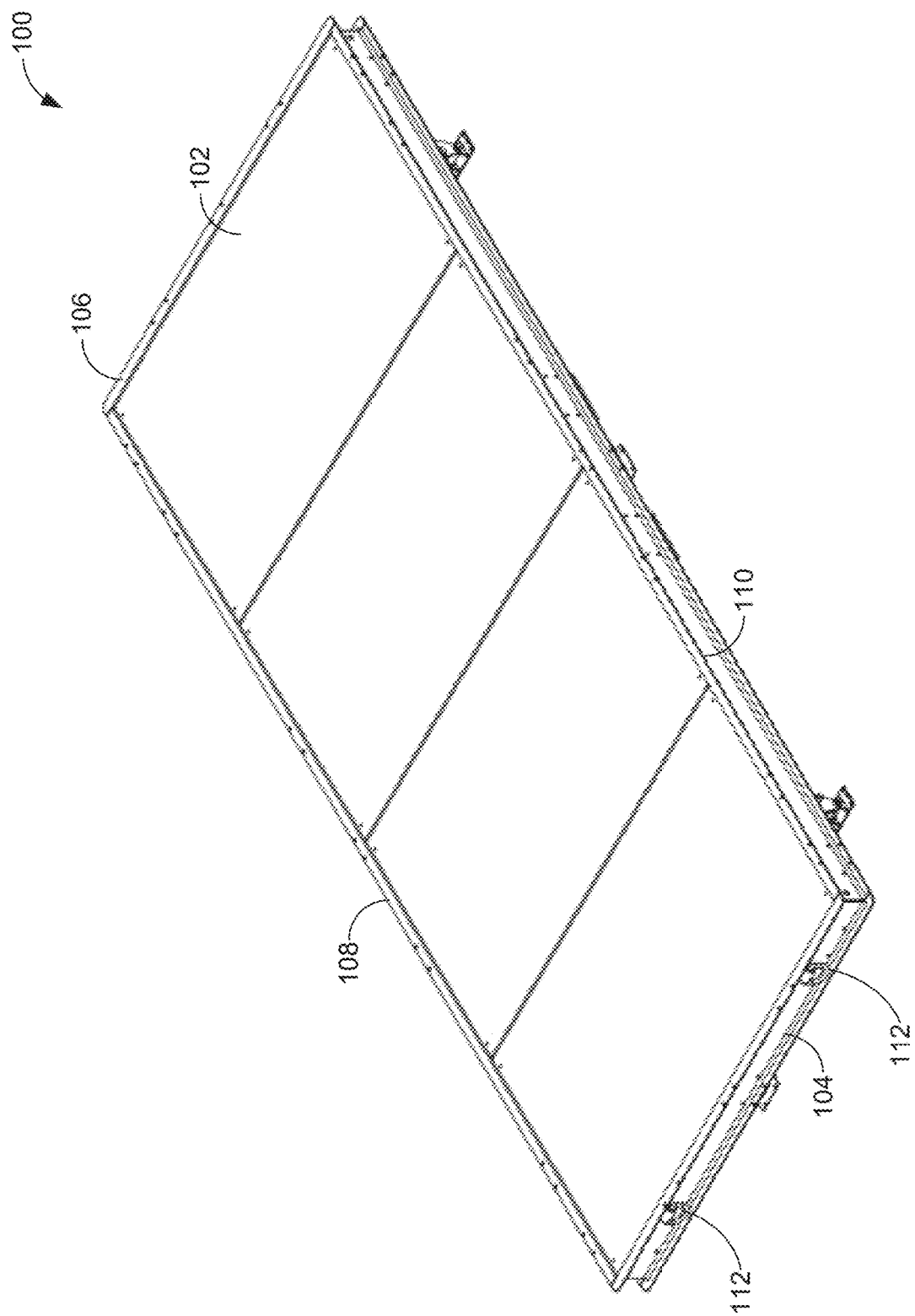
FIG. 1 illustrates a top perspective view of an exemplary automated platform, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and apparatuses for the utilization of a manual or automated platform to decrease the loading and unloading times for goods into and out of a trailer at a loading dock. In various embodiments, an automated platform may autonomously move around a site, loading dock, dock leveler, and/or trailer to transport goods. In one or more embodiments, the automated platform may be loaded with goods in various containers, such as pallets, boxes, or free-standing, and, once loaded, navigate a path from a loading area onto a trailer autonomously. In some embodiments, once the automated platform is loaded onto the trailer, the automated platform may utilize hydraulics to extend legs to the ground with enough force so that the automated platform wheels are not touching the ground in the trailer, which stabilizes the automated platform while it is being hauled to a different site. In at least one embodiment, once the trailer is at the different site, the automated platform may autonomously unload itself out of the trailer and navigate over a dock leveler, through the loading dock, and to an unloading area.

In certain embodiments, the platform may be mechanized and can be driven via a remote control by an operator. This enables the platform to be moved in any direction or along any path as desired. In other embodiments, the platform may include software intelligence that enables automated and autonomous driving based on a set of provided instructions or parameters. For example, the platform may autonomously move from a loading dock into a shipping or trucking container, avoid any walls or edges of the container via sensors, stop at the front of the container, and then settle itself based on an understanding that the container is safely within the container.

In one or more embodiments, if two sites are sufficiently close, the automated platform may transport goods from one site to the other site by moving between sites (e.g., does not get loaded onto a trailer).

In multiple embodiments, the automated platform may be sized such that the automated platform, or multiple automated platforms, may fit into a trailer. In one or more embodiments, trailers have standardized lengths and widths, and standardized weight capacities that may limit the size and weight of the automated platform. In some embodiments, the hydraulic system may push an automated platform in the air so that a second automated platform may fit underneath the raised automated platform.

In several embodiments, the automated platform may utilize omni-directional wheels so that the automated platform may more easily navigate through physical spaces. In at least one embodiment, the automated platform utilizes sensors to collect obstacle data that is utilized to avoid obstacles while navigating through the site.

In various embodiments, each site may have a local mesh network so that an automated platform at a given site can connect to the local mesh network and communicate with other automated platforms and users via controllers. In some embodiments, users may send commands to the automated platform, such as a location to navigate to, through the local mesh network, and the automated platform may communicate with a cloud database or other automated platforms to receive mapping information for the site, speed limits for the site, and other information that the automated platform may utilize to navigate to the location. In at least one embodiment, the automated platform may utilize data received from the sensors to create the mapping information. In one or more embodiments, a first automated platform at a site may share created mapping information with a second automated platform at the given site, such that the second automated platforms may combine the created mapping information received from the first automated platform with mapping information created by the second automated platform to create a composite map of the given site (e.g., a map or map data including information from the first automated platform and the second automated platform). In many embodiments, the automated platforms at a given site may update the map of the given site by receiving updated mapping information from the sensors. In one embodiment, the automated platform may also send the mapping information and/or map to a controller node such that the map can be shared over the local mesh network. In several embodiments, the mapping information may include metadata including specific site location information, such as, but not limited to, dock numbers, loading area numbers, and other specific site location information to support autonomous movement of the automated platform.

Exemplary Embodiments

Referring now to the figures, for the purposes of example and explanation of the fundamental processes and components of the disclosed systems and methods, reference is made to FIG. 1, which illustrates an exemplary, high-level overview 100 of one embodiment of the automated platform. As will be understood and appreciated, the exemplary, high-level overview 100 shown in FIG. 1 represents merely one approach or embodiment of the present system, and other aspects are used according to various embodiments of the present system.

As shown in FIG. 1, a top perspective view of an exemplary automated platform 100 is shown, according to one embodiment of the present disclosure. In various embodiments, the automated platform 100 may receive and transport goods into and out of a trailer at a loading dock. The platform may also be used to move goods around in a warehouse, or between warehouses or buildings, particularly where only short distances are required. In some embodiments, the goods may be in boxes, on pallets, and/or in other packaging, or may not be in or on packaging. In many embodiments, the automated platform 100 includes a top surface 102 for receiving and transporting the goods, a bottom surface 502 (see FIG. 5), a front side 104, a back side 106, and sides 108 and 110. In at least one embodiment, the automated platform 100 may also include one or more motors for operating one or more wheel modules 302, an electrical control system, a battery for powering the one or more motors and communication module, a plurality of sensors to detect ambient conditions and enable certain automated functionality, and a hydraulics module.

In multiple embodiments, the automated platform 100 may be constructed of one or more materials that allow the automated platform 100 to hold the maximum weight capacity of a trailer (e.g., 40,000 pounds, 44,000 pounds, 48,000 pounds, etc.). In some embodiments, if two or more automated platforms 100 are loaded into a trailer, the combined weight capacity of the two or more automated platforms 100 may hold the maximum weight capacity of the trailer. In one or more embodiments, the top surface 102 may support the weight capacity and provide sufficient friction to keep the goods in place throughout the loading/hauling/unloading processes. In at least one embodiment, the top surface 102 may be wood (e.g., plywood), aluminum, steel, or other similar materials. In one embodiment, the top surface 102 may include a high friction paint painted onto the surface of the top surface 102, or may include some other frictional material, such as rubber, cork, etc. In at least one embodiment, the front side 104, back side 106, and sides 108 and 110 may fixedly connect to the top surface 102 via connection elements (e.g., bolts, nails, screws, etc.). In some embodiments, the front side 104, back side 106, and sides 108 and 110 may be made of steel (e.g., C-channel steel) or other materials that can support the weight of the goods. In a certain embodiments, the front side 104, back side 106, and sides 108 and 110 may include bumpers to protect the automated platform 100 from damage in the case of a collision with the automated platform 100 (e.g., a forklift driving into the automated platform 100) by absorbing the contact of the collision. In one or more embodiments, the front side 104, back side 106, and sides 108 and 110 may include attachment points 112, such as, but not limited to, towing rings, fasteners, D-rings, handles, and other similar features, for further securing the goods to the automated platform 100 or attaching additional components to the automated platform 100. As described herein, the front side 104, back side 106, and opposing sides 108 may collectively be referred to as the "perimeter surface" of the platform. In certain embodiments, the perimeter surface acts as a skirt that extends downwardly from the top surface 102 to add rigidity to the platform and also to act as a protective shield for internal components of the platform.

In certain embodiments, a standard trailer may carry cargo of up to 50,000 pounds. In some embodiments, if multiple automated platforms fit inside a trailer for hauling, then the weight capacity of each of the multiple automated platforms 100 may be generally equal to the maximum weight capacity of the trailer divided by the number of multiple automated platforms 100. For example, in one embodiment, if three automated platforms 100 are loaded inside a trailer, and the trailer has a maximum weight capacity of 48,000 pounds, then each of the automated platforms 100 may have a weight capacity of 16,000 pounds. In other embodiments, the automated platform 100 may have a larger weight capacity than the weight capacity of a standard trailer if the automated platform 100 is used to only move goods around in a warehouse, or between warehouses or buildings (e.g., the automated platform 100 is not loaded onto a trailer).

In several embodiments, the automated platform 100 also includes an electrical control system to facilitate the movement of the automated platform 100. In one or more embodiments, the electrical control system may include one or more sensors, communication devices, a movement control system, computer hardware, and hardware interfaces. In some embodiments, the electrical control system may be IoT-enabled to communicate via Bluetooth, near-field communications, LTE communications, and/or other similar communication methods.

In various embodiments, the one or more sensors may provide navigation data, safety sensing, weight and payload information, and additional monitoring data. In one or more embodiments, the one or more sensors may collect sensor data and send the sensor data to the movement control system via a local ad hoc mesh network or other network communication system (e.g., IoT system, Wi-Fi, etc.). In at least one embodiment, the one or more sensors may include one or more obstacle detection sensors 504 (see FIG. 5), such as, but not limited to, light detection and ranging sensors (LIDARs), three-dimensional (3D) cameras, and/or infrared (IR) sensors, global positioning system (GPS) unit, one or more environmental sensors, temperature sensors, voltage sensors, current sensors, pressure sensors, and/or other similar sensors. In some embodiments, the voltage sensors and current sensors may detect whether the automated platform 100 is charging, and if so, the voltage sensors and current sensors may not allow the automated platform to move. In certain embodiments, the voltage sensors may also measure the battery voltage and send a signal to the automated platform 100 and/or controller to communicate when the automated platform 100 should be charged.

In many embodiments, the navigation data may be provided to the electrical control system by the obstacle detection sensors 504, such as, but not limited to, LIDARs, 3D cameras, and/or IR sensors. In at least one embodiment, the LIDARs may sense one or more obstacles in or near a traveling path of the automated platform 100 (e.g., the walls of the trailer while autonomously navigating inside the trailer), collect data from sensing the one or more obstacles, and send the data to the movement control system. In some embodiments, the LIDARs may be mounted in the middle of the front side 104, back side 106, and sides 108 and 110. In certain embodiments, the LIDARs are inset slightly for protection and a better field of view. In one or more embodiments, the 3D cameras may be mounted on the front side 104, the back side 106, and/or the sides 108 and 110 of the automated platform 100. In one embodiment, the 3D cameras may observe the ground around the automated platform 100 to ensure the ground is drivable, and may also to log video recordings of all automated platform 100 motion for future analysis or machine learning algorithm development.

In several embodiments, the LIDARs and 3D cameras may generate one or more point clouds from the collected data that is utilized to detect obstacles and communicate the locations of the obstacles to the controller and/or the automated platform 100. In at least one embodiment, the 3D cameras may provide additional navigation information via stereoscopic video frames and/or an infrared (IR) point cloud. In some embodiments, the collected data and/or point cloud may be utilized to identify obstacles at the movement control system and/or computer hardware of the automated platform 100. In one or more embodiments, the automated platform 100 may utilize the collected data and/or one or more point clouds to identify the trailer and/or trailer door, and create commands for the automated platform to move into the trailer. In one embodiment, machine learning algorithms may also be utilized by the automated platform 100 to determine additional information about the obstacles detected by the LIDARs and 3D cameras, such as, but not limited to, whether the obstacles are humans, static, etc., and also may read written information on obstacles, such as, but not limited to, tags on pallets containing pallet information, dock numbers, warehouse information, etc.

In various embodiments, the LIDARs and 3D cameras may also provide safety sensing for electronic control system. In one or more embodiments, the LIDAR data is utilized by the electrical control system to autonomously navigate into the trailer and also stop the automated platform 100 if the automated platform gets too close to an obstacle (e.g., wall, person laying down, box, etc.). In some embodiments, the LIDARs may be mounted about 4 to 12 inches off of the ground so that the LIDARs can identify a person in the prone position while not reducing the ground clearance of the automated platform 100. In many embodiments, additional one or more LIDARs and/or IR sensors may also be located on the front side 104, the back side 106, and/or the sides 108 and 110 of the automated platform 100 to further detect obstacles. In one embodiment, if the sensors detect an obstacle, the automated platform 100 may not drive into the obstacle, as part of the safety measures of the automated platform.

In multiple embodiments, the weight and payload information may be provided by the environmental sensors. In some embodiments, the environmental sensors may include GPS sensor(s), temperature sensor(s), pressure sensor(s), humidity sensor(s), inertial measurement unit (IMU) to acceleration sensor(s), and/or weight sensor(s). In one or more embodiments, each of the GPS sensors, temperature sensors, pressure sensors, humidity sensors, inertial measurement unit (IMU) to acceleration sensor, and/or weight sensor may provide insight into the automated platform 100 transit usage and conditions. In at least one embodiment, the electrical control system may include payload and transport condition requirements (e.g., temperature requirements inside the trailer, weight of the goods on the automated platform 100), and the environmental sensors may collect data that validates that the payload and transport condition requirements were maintained throughout the loading/hauling/unloading process. In one embodiment, the GPS sensors may determine some transport conditions, such as the time the automated platform 100 transported the payload, whether the transportation of the payload stayed on schedule, the path the automated platform 100 traveled, etc.

In several embodiments, the movement control system controls the automated platform 100 and communicates with the one or more sensors and communication devices. In one or more embodiments, the movement control system may receive data from the one or more sensors and control the movement of the automated platform 100 based on the received data. In at least one embodiment, the movement control system may include a computer operating a robotic operating system (ROS) software application, and a microcontroller (e.g., Arduino microcontroller) that controls hardware interfaces and sensor handling. In one or more embodiments, the ROS may plan a path for the automated platform 100 to travel that avoids obstacles and reaches a destination. In certain embodiments, the one or more sensors monitor the travel information of the automated platform 100 (e.g., location, speed, acceleration) as the automated platform 100 travels along the path, and send the travel information to the ROS system, which utilizes the travel information to recalculate wheel speeds to maintain the automated platform on the path. In some embodiments, the movement control system is connected to a cloud server via IoT communications (e.g., a MQTT IoT bridge). In one embodiment, the movement control system receives and sends commands from a local controller through a mesh network module (e.g., a ZigBee module), which may be supplemented by a LAN connection that can act as a backup to the mesh network. In at least one embodiment, the microcontroller may receive the wheel speed information from the ROS system and utilized a control system 506 (e.g., sensors to measure the actual wheel speed) to compute the actual wheel speeds. In certain embodiments, the microcontroller may utilize the actual wheel speeds and a control algorithm to determine an amount of power from a motor to align the actual wheel speed with the recalculated wheel speeds. In one embodiment, the microcontroller may also utilize additional information, such as, but not limited to, payload weight, weather information, etc., to adjust the power input to the wheels to better align the actual wheel speeds to the recalculated wheel speeds.

In multiple embodiments, the movement control system may include artificial intelligence/machine learning algorithms such that the automated platform 100 may be fully autonomous. In some embodiments, the automated platform 100 may autonomously navigate a loading dock, docking location, storage area, dock leveler, trailer, and/or other areas of a site to which the automated platform 100 may be commanded to travel. In one or more embodiments, the machine learning algorithms may include a system to detect the trailer and/or trailer door based on the distance between the side walls of the trailer. In many embodiments, the automated platform 100 may also capture sensor data from each of the one or more sensors while the automated platform 100 is moving, and the captured data may be a training set for a machine learning perception system. In at least one embodiment, the machine learning perception system may be trained to detect a position and width of a dock leveler, determine an importance level for detected obstacles (e.g., detect that an obstacle is a human and give the human obstacle a high importance level rating so that the automated platform 100 does not hit or move near the human obstacle), and/or detect undrivable surfaces (e.g., rough surfaces, debris on surface, etc.).

In several embodiments, each automated platform 100 may include a mesh network module that is designed to interact with industrial mesh networks via network nodes. In at least one embodiment, each docking location may include an ad hoc local mesh network to which the mesh network module connects when the automated platform 100 arrives to the docking location. In many embodiments, the mesh network module may also include an LTE connection to facilitate authentication between network nodes through a cloud provider. In one or more embodiments, once a mesh network module on a newly arrived automated platform 100 connects to the ad hoc local mesh network at the docking location, the newly arrived automated platform 100 can be commanded from a manual remote controller that is also connected to the local mesh network, an on-site autonomous controller, or a cloud-based orchestrator. In certain embodiments, the automated platforms 100 that are on the same local ad hoc mesh network may share information about the current docking location (e.g., map of docking location, speed limits, Wi-Fi passwords, etc.) through the ad hoc network.

In various embodiments, the automated platform 100 may include a scannable code (e.g., a QR code, RFID, or bar code). In some embodiments, a user with a remote controller may scan the scannable code on the automated platform 100 with the remote controller to connect the remote controller to the automated platform 100. In many embodiments, upon scanning the scannable code with the remote controller, the remote controller connects to the automated platform 100 via a mesh network address for the automated platform 100. In certain embodiments, once connected, the remote controller and automated platform 100 may exchange commands, information, E-stop status, and heartbeat messages to maintain safe control of the automated platform 100. In at least one embodiment, the remote controller may utilize one or more dead-man switches to maintain the automated platform 100 in a non-estopped state. For example, in one embodiment, the one or more of the dead-man switches may be held down before the user is able to cause the automated platform 100 to move, and if the user stops holding down the one or more dead-man switches, the automated platform 100 may automatically stop moving. In one or more embodiments, an E-stop command may be built into the mesh network or software so that any failure on either the remote controller's or automated platform's CPU will not result in a loss of safety. In many embodiments, the E-stop status is the current status of the E-stop command.

In multiple embodiments, the automated platform 100 may be designed to move in formation in relation to other automated platforms 100. For example, in one embodiment, if three automated platforms 100 arrive to a docking location, a user may scan the scannable code on a first automated platform 100 (e.g., the automated platform 100 nearest to the trailer door) to connect the firsts automated platform with the local ad hoc mesh network. Continuing with the example, in at least one embodiment, once all automated platforms 100 in the trailer are connected to the local ad hoc mesh network, each automated platform 100 may understand the location of the automated platform (e.g., the position relative to the other automated platforms 100 in the trailer) using the 3D cameras, scannable codes, and/or RFID readers or tags to identify the immediately neighboring automated platforms 100. Still continuing with the example, in some embodiments, once the automated platforms 100 know the positioning of each automated platform 100 in the trailer, the automated platforms 100 may autonomously coordinate the unloading process (e.g., navigating each automated platform 100 off of the trailer).

In several embodiments, the automated platform 100 may also include a GPS unit so that the location of the automated platform 100 can be tracked and managed. In some embodiments, the GPS unit may send location information to a system user, so that the system user may know, in real time, the location of the automated platform 100. In at least one embodiment, the system user may know the location of every automated platform 100 in circulation, whether or not each automated platform 100 is in transit or in a facility.

Figure 2:
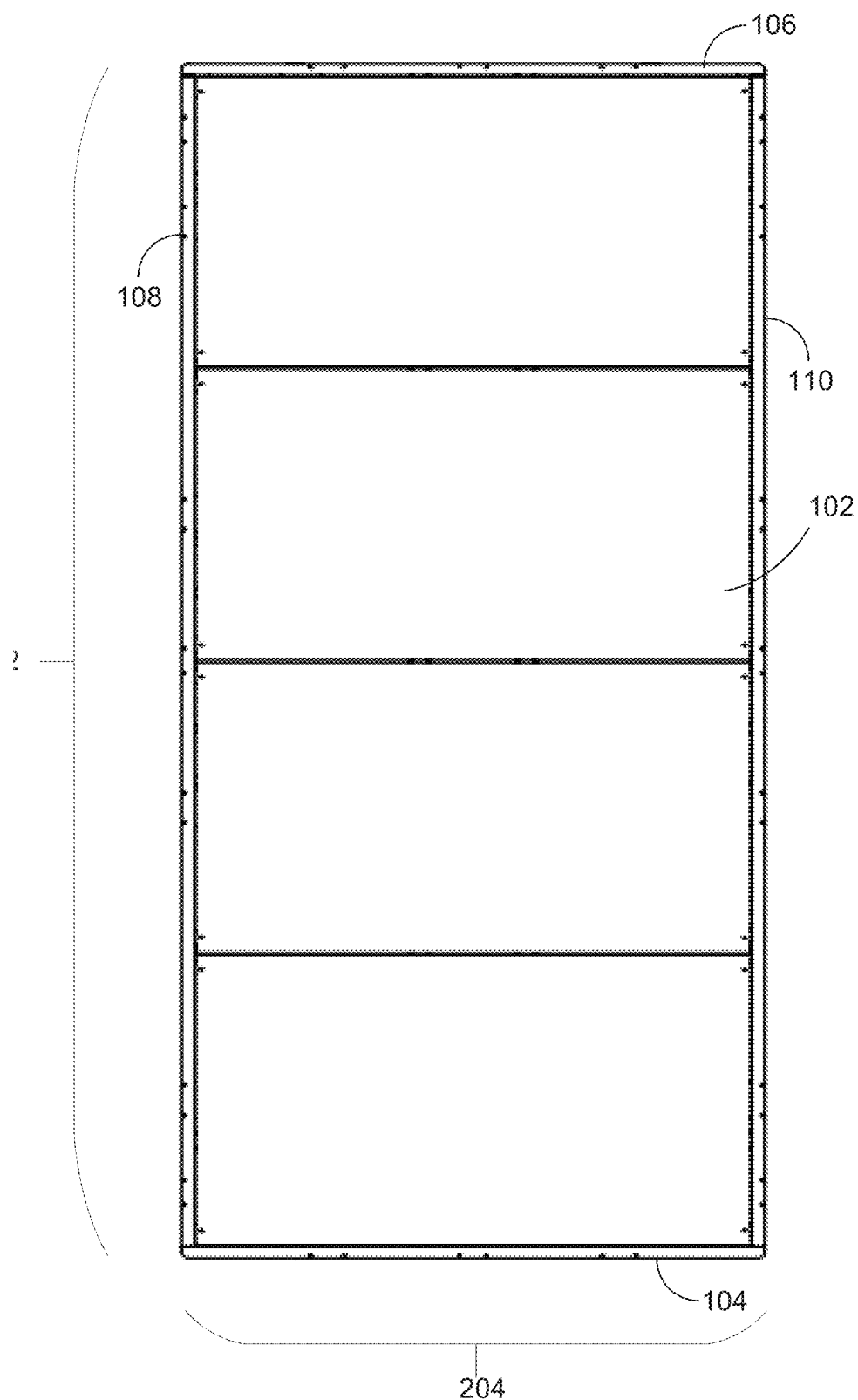
FIG. 2 illustrates a top view of an exemplary automated platform, according to one embodiment of the present disclosure.

As shown in FIG. 2, a top view of an exemplary automated platform 100 is shown, according to one embodiment of the present disclosure. In multiple embodiments, the front side 104, the back side 106, and the sides 108 and 110 may connect so that the automated platform is a quadrilateral shape. In one embodiment, the quadrilateral shape may be a rectangle. In other embodiments, the platform may have any shape suitable for desired end use cases, including triangles, circles, or other polygons. In some embodiments, the automated platform 100 may have a length 202 and a width 204 so that the automated platform 100 fits inside a trailer. In at least one embodiment, the length 202 (e.g., the length of the sides 108 and 110) may be between four and forty-eight feet (e.g., 4 feet, 8 feet, 16 feet, 25 feet, 40 feet, etc.). In one or more embodiments, the width 204 (e.g., the length of the front side 104 and the back side 106) may be between 2 and 8.5 feet (e.g., 2 feet, 4 feet, 5 feet, 8.5 feet, etc.), such that the automated platform 100 can fit inside the doors and width of the trailer. In certain embodiments, the front side 104, the back side 106, and the sides 108 and 110 may be sized such that more than one automated platforms may fit inside a trailer. For example, in one embodiment, three automated platforms 100 having dimensions of 16 feet (or just under) in length and 8 feet (or just under) in width may fit inside a trailer having a length of 48 feet and a width of 8.5 feet.

In various embodiments, the automated platform 100 may have a surface area that fits one or more pallets. In one embodiment, a standard pallet has dimensions of 48 inches long and 40 inches wide. As shown in greater detail in connection with FIG. 8, some embodiments may be configured to fit a specific number of pallets, such as 8 pallets, or 6 pallets, or any other number as desired. For these embodiments, the specific sizing and shape of the platform is important for its end use case. In at least one embodiment, the automated platform 100 may be sized to hold 1-26 pallets.

In multiple embodiments, the automated platform 100 may include one or more transport modules attached to the top surface 102, front side 104, back side 106, and/or sides 108 and 110 to optimize the automated platform 100 for transporting specific goods. In one or more embodiments, the one or more transport modules may include a rack module, a conveyor module, a Gaylord module, a liquid module, a refrigerated module, a baled holder module, and a cart module. In at least one embodiment, the conveyor module may include conveyor belts on the top surface 102 of the automated platform 100 to cycle pallets to specific areas on the automated platform 100 or to cycle pallets to one or more additional automated platforms 100. For example, in one embodiment, the pallets may be fed onto a first automated platform 100 with a conveyor module, and the first automated platform 100 may cycle the pallets to a second automated platform 100 via the conveyor module. In certain embodiments, the automated platform 100 with a conveyor module may integrate with existing conveyor belt systems.

In several embodiments, the automated platform 100 may also include a forklift operatively connected to its front side 104, the back side 106, and/or the sides 108 and 110 so that the automated platform 100 may load pallets onto itself via the operatively connected fork lift. In this embodiment, the automated platform 100 may also include the conveyor module on the top surface 102, so that when the forklift loads a pallet onto the top surface, the pallet is loaded onto a conveyor belt system that can cycle the pallet to a different part of the automated platform 100.

Figure 3A:
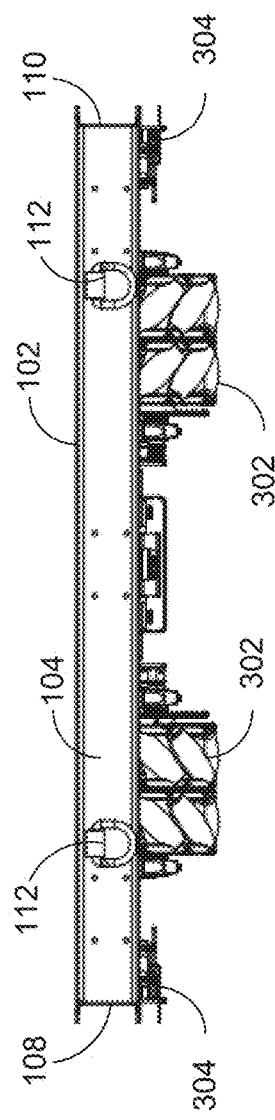
FIG. 3A illustrates a front view of an exemplary automated platform, according to one embodiment of the present disclosure.

As shown in FIG. 3A, a front view of an exemplary automated platform 100 is shown, according to one embodiment of the present disclosure. In several embodiments, the automated platform 100 includes one or more wheel modules 302 and hydraulic system 304. In one or more embodiments, each of the one or more wheel modules 302 may include one or more wheels, a motor, and suspension (see FIGS. 7A-7C for further details).

In certain embodiments, each of the one or more wheel modules 302 may have two wheels driven by a single motor to allow the wheels to handle the weight of the goods. In one or more embodiments, the number of wheels per one or more wheel modules 302 and number of one or more wheel modules 302 per automated platform 100 may change if the automated platform 100 is designed to carry heavier or lighter payloads. In certain embodiments, the platform 100 may include four wheel modules 302. In other embodiments, the platform may include more than four wheel modules as desired to provide additional stability and force distribution to the platform.

In several embodiments, the one or more wheels may be mecanum wheels, which enable instantaneous holonomic movement. In some embodiments, the one or more wheels may be other omni-directional wheel types or a powered rotating castor, or a more standard tank drive setup. In many embodiments, the automated platform 100 may have four wheel modules 302, with two wheel modules 302 closer to the front side 104 and two wheel modules 302 closure to the back side 106. In at least one embodiment, the two wheel modules 302 closer to the front end 104 and the two wheel modules 302 closer to the back side 106 may be a certain widths apart (the "track width") from each other. In one or more embodiments, the track width, defined as the distance between the outside of the wheels, is an important measure to ensure that the automated platform 100 can navigate a 6 foot wide dock leveler when a truck is parked at the worst possible lateral offset. In one embodiment, the track width (width between the outermost parts of the wheels) may be less than six feet. In some embodiments, wider track widths may be appropriate if targeting wider dock levelers or requiring more precision from the trailer's parking precision.

In various embodiments, the motor is connected to the one or more wheels via a chain drive to provide a cheaper gear reduction than a transmission while also providing a mechanical fuse in case of a motor overpower or wheel impact loading. In some embodiments, the motor may be a permanent magnet DC motor due to its relatively low cost and widespread availability, or may be brushless DC or AC motors to provide efficiency improvements.

In many embodiments, the maximum power output from the motors may generally equal the requirement to drive the fully loaded automated platform 100 up a dock leveler's slope and a slanted loading dock. For example, in one embodiment, the maximum power output may be approximately equal to 4800 total watts of power. In some embodiments, each motor may have a maximum power output of 500 watts to 1500 watts, depending on the size of the automated platform 100.

In multiple embodiments, each of the one or more wheel modules 302 is connected to the automated platform 100 via a hinged passive spring damper suspension that permits compliance in the lengthwise direction. In one embodiment, the suspension is sized to ensure that all wheels remain on the ground with an unloaded to fully loaded automated platform 100 while going over the dock leveler.

In certain embodiments, the wheel modules 302 may instead utilize an active suspension where the load to each wheel module 302 is measured, fed back to a microcontroller, and then adjusted to ensure constant equal force on all of the one or more wheels. In one embodiment, the wheel module 302 may include additional load sensing components (e.g., weight sensors) within the suspension to adjust the active suspension to ensure constant equal force on all of the one or more wheels. In one or more embodiments, the load sensing components may determine that the automated platform 100 is loaded unevenly by sensing the weight of the payload(s) on the automated platform 100 at or near each wheel module 302, and may cause a message to be sent to an operator to reload the payload(s) on the automated platform 100.

Figure 3B:
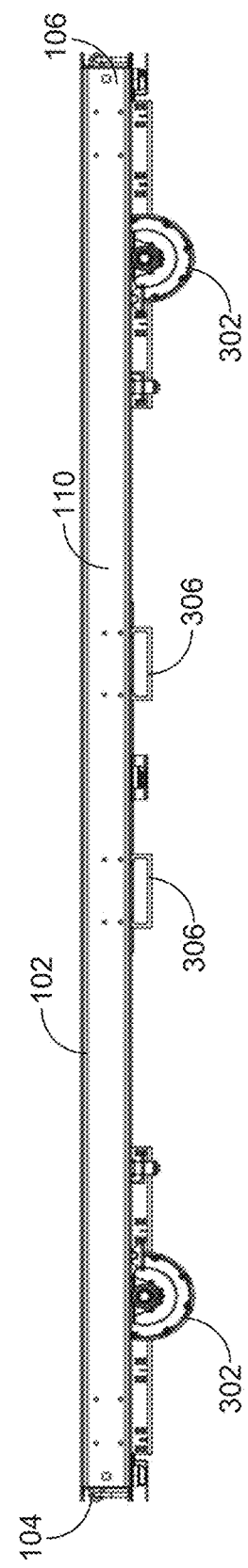
FIG. 3B illustrates a side view of an exemplary automated platform, according to one embodiment of the present disclosure.

As shown in FIG. 3B, a side view of an exemplary automated platform 100 is shown, according to one embodiment of the present disclosure. As shown in FIGS. 3A and 3B, the hydraulics are not engaged. In at least one embodiment, the automated platform 100 may include forklift pockets 306 and 602 (see FIG. 6). In one embodiment, the forklift pockets 306 and 602 may define an opening such that forks on a forklift can go through the forklift pockets 306 and 602. In some embodiments, the forklift pockets 306 and 602 may stabilize the forks on a forklift (or multiple forklifts) so that the forklift(s) can lift and transport the automated platform 100. In one or more embodiments, the automated platform 100 may be lifted by forklift(s) via the forklift pockets 306 and 602 and placed on top of another automated platform 100 for more efficient storage or for transporting multiple automated platforms 100 on top of one another. For example, in one embodiment, an automated platform 100 may fail, and so one or more forklifts may lift the failed automated platform 100 onto another automated platform 100 so that the failed automated platform can be transported.

Figure 4A:
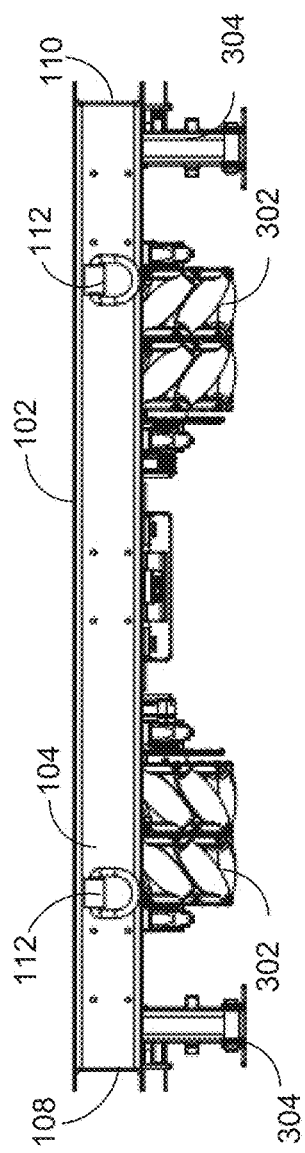
FIG. 4A illustrates a front view of an exemplary automated platform, according to one embodiment of the present disclosure.
Figure 4B:
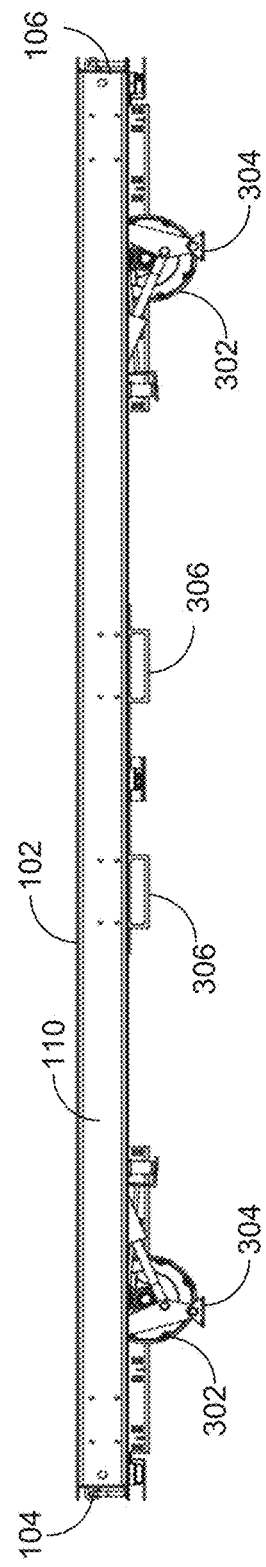
FIG. 4B illustrates a side view of an exemplary automated platform, according to one embodiment of the present disclosure.

As shown in FIG. 4A, a front view of an exemplary automated platform 100 is shown, according to one embodiment of the present disclosure. In various embodiments, in FIGS. 4A and 4B, the hydraulic system 304 is engaged such that the automated platform is contacting the ground with the hydraulics and not the wheel modules 302.

In several embodiments, the hydraulic system 304 may lift the automated platform 100 up off of the wheels to secure the automated platform from movement. In some embodiments, the hydraulic system 304 may be utilized when the automated platform 100 is within a trailer during transit so that the automated platform cannot move, or at other times when a user does not want the automated platform 100 to move (e.g., while loading goods onto the automated platform 100). In many embodiments, the base of the hydraulic system 304 is fitted with load cells to monitor the weight of the payload on the platform to prevent overloading the automated platform 100 and/or trailer, to provide weight and distribution information to the electrical control system, and to provide information about the payload to be used for usage-based pricing. In at least one embodiment, the hydraulic system 304 may also be utilized to raise the automated platform 100 so that the components and sensors on the automated platform 100 may be safely tested. In one or more embodiments, the hydraulic system 304 may be utilized to stack automated platforms 100 above each other to allow transport of a larger number of robots per truck. In one embodiment, ancillary hydraulic systems may be included that utilize hydraulic power, such as, but not limited to, hydraulic load restraints, powered shelving to facilitate stacking, pallet lifting or moving mechanisms, and other integrations with other warehouse or loading equipment.

In multiple embodiments, the hydraulic system 304 is sized such that the hydraulic system 104 can lift the full payload plus automated platform 100 weight off of the floor and beyond the full stroke of the wheel suspension. In one embodiment, the hydraulic system 304 uses a pressure rating of about 3600 PSI to provide the necessary force to lift the full payload.

In several embodiments, the hydraulic system 304 utilizes four cylinders mounted near the contact points of the wheels, which allows for the chassis strength to be concentrated in the same locations.

In at least one embodiment, the hydraulic system 304 utilizes a hinged-arm motion to extend (e.g., in use) and retract (e.g., not in use). In some embodiments, when the hydraulic system 304 is not in use (e.g., retracted), the wheels are the point of contact with the ground, and the hydraulic system 304 is retracted into a cavity under the automated platform 100. In one or more embodiments, when the hydraulic system 304 is in use to stabilize the automated platform 100, a cylinder arm is extended from a cylinder, which causes the hinged-arm to rotate towards the ground. As the hinged-arm contacts the ground, the cylinder arm continues to extend, which lifts the wheels of the automated platform 100 off of the ground.

In certain embodiments, the hydraulic system 304 may not fully lift the automated platform 100 off of the wheel modules 302, but instead may provide enough downward force through the hydraulic legs to keep the automated platform 100 in place during transit in a trailer, while a payload is being loaded onto or unloaded off of the automated platform 100, and/or while the automated platform 100 is not in use. In another embodiment, the hydraulic legs may extend outwardly towards the side walls of the trailer rather than extending downwards to the ground. In this embodiment, the hydraulic legs may contact and press against the side walls of the trailer to provide stability during transit. In yet another embodiment, the hydraulic system 304 may cause the automated platform 100 to lower over the wheel modules 302 such that platform skirt contacts the ground. In some embodiments, the automated platform 100 may use brakes on the wheel modules 302, which may be used in addition to the hydraulic system 304 or without a hydraulic system 304. In multiple embodiments, the automated platform 100 may not utilize hydraulics to move the legs of the hydraulic system 304 to the ground, but instead may utilize gear drives, an electric motor, or an electro-hydraulic actuator to drive the legs to the ground.

Figure 5:
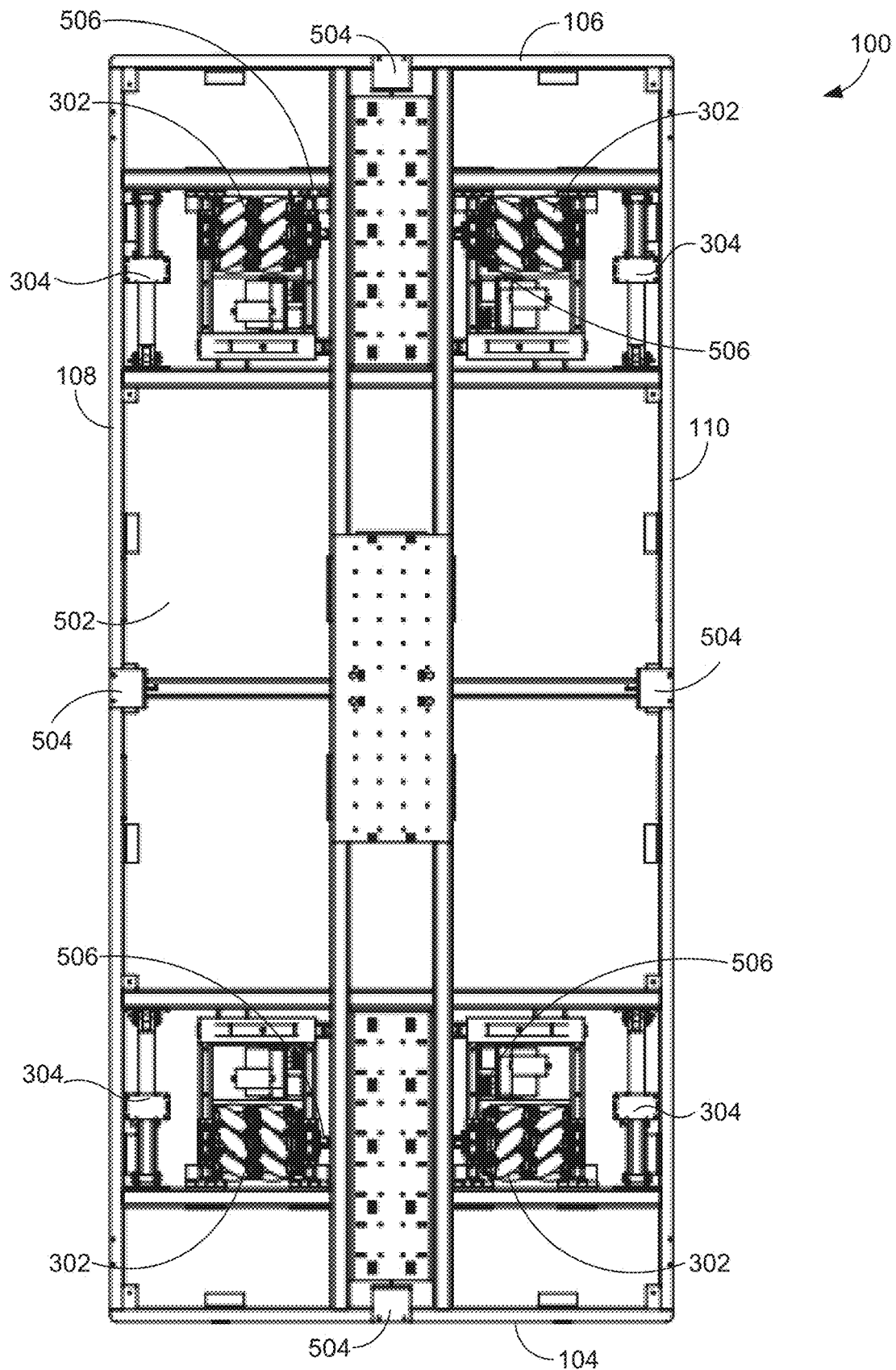
FIG. 5 illustrates a bottom view of an exemplary automated platform, according to one embodiment of the present disclosure.

As shown in FIG. 5, a bottom view of an exemplary automated platform 100 is shown, according to one embodiment of the present disclosure. In various embodiments, the automated platform 100 also includes a bottom surface 502, obstacle detection sensors 504, and/or control system 506.

In at least one embodiment, the control system 506 may receive commands from the controller, movement control system, or electrical control system for controlling the direction and speed each wheel of the wheel module 302 turns.

Figure 6:
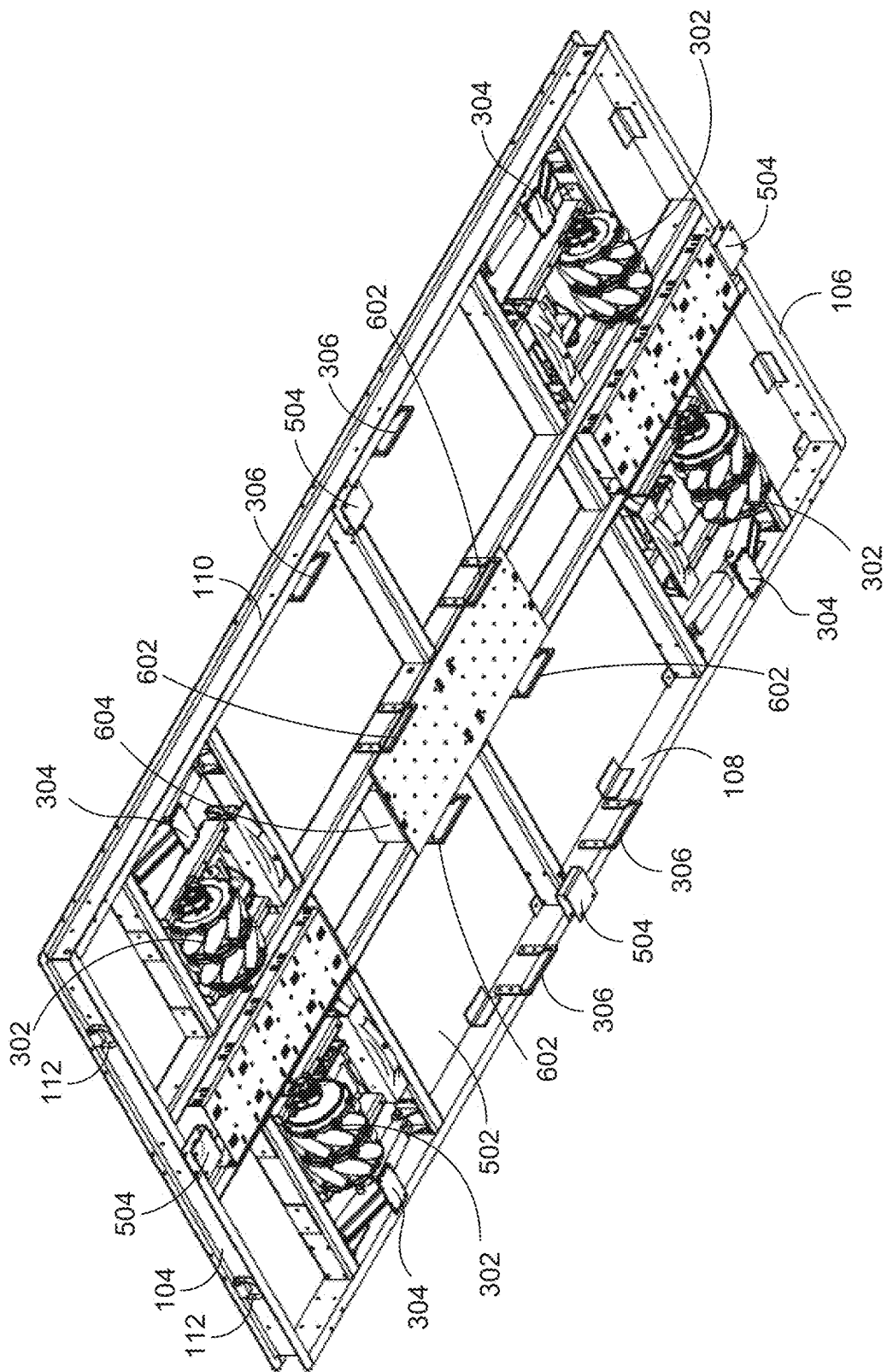
FIG. 6 illustrates a bottom perspective view of an exemplary automated platform, according to one embodiment of the present disclosure.

As shown in FIG. 6, a bottom perspective view of an exemplary automated platform 100 is shown, according to one embodiment of the present disclosure. In multiple embodiments, the automated platform 100 may also include forklift pockets 602 and computer module 604.

In one or more embodiments, the computer module 604 may include the environmental sensors, current sensors, voltage sensors, hydraulic pressure sensors (for measuring the payload weight), IoT components for collecting, storing, and sending sensor data to a network.

As shown in FIG. 7A, a side view of an exemplary wheel module 302 of an automated platform 100 is shown, according to one embodiment of the present disclosure. In various embodiments, the wheels may be a certain diameter so that the bottom of the perimeter skirt of the automated platform 100 is a height 701 from the ground. In at least one embodiment, the height 701 may be such a height so that the one or more sensors, components, and hydraulics system 304 clear the ground while the automated platform 100 is moving. In one or more embodiments, the height 701 may be at least two inches (e.g., two inches, 6 inches, 12 inches, etc.).

Figure 7B:
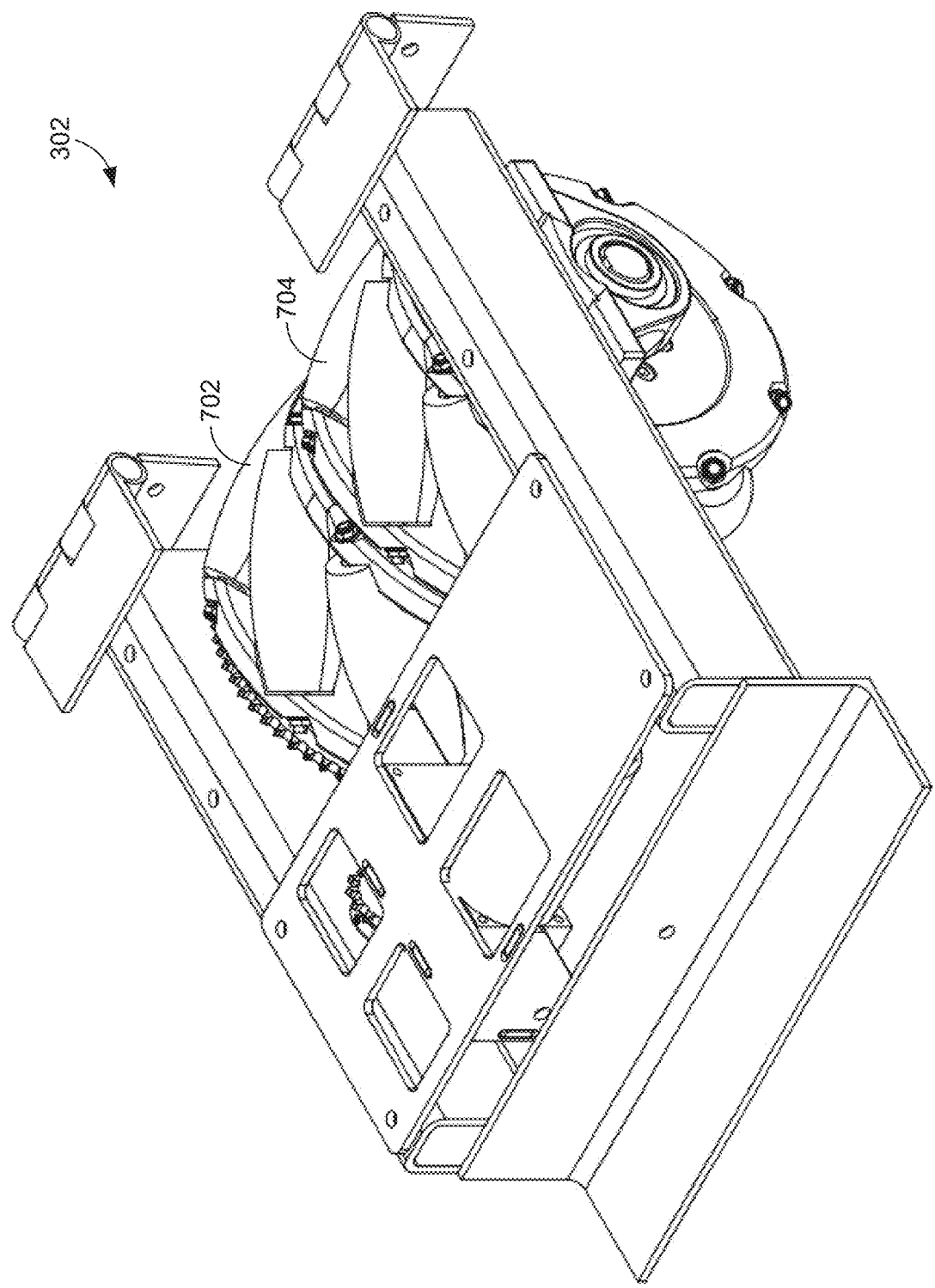
FIG. 7B illustrates a top perspective view of an exemplary wheel system of an automated platform, according to one embodiment of the present disclosure.

As shown in FIG. 7B, a perspective view of an exemplary wheel module 302 of an automated platform 100 is shown, according to one embodiment of the present disclosure. In several embodiments, the wheel module 302 may include a first wheel 702 and a second wheel 704 (also "wheels 702 and 704). In one or more embodiments, the wheel module 302 may include only one wheel, or may include more than two wheels. In some embodiments, the wheels 702 and 704 may rotate in the same direction and at the same speed.

Figure 7C:
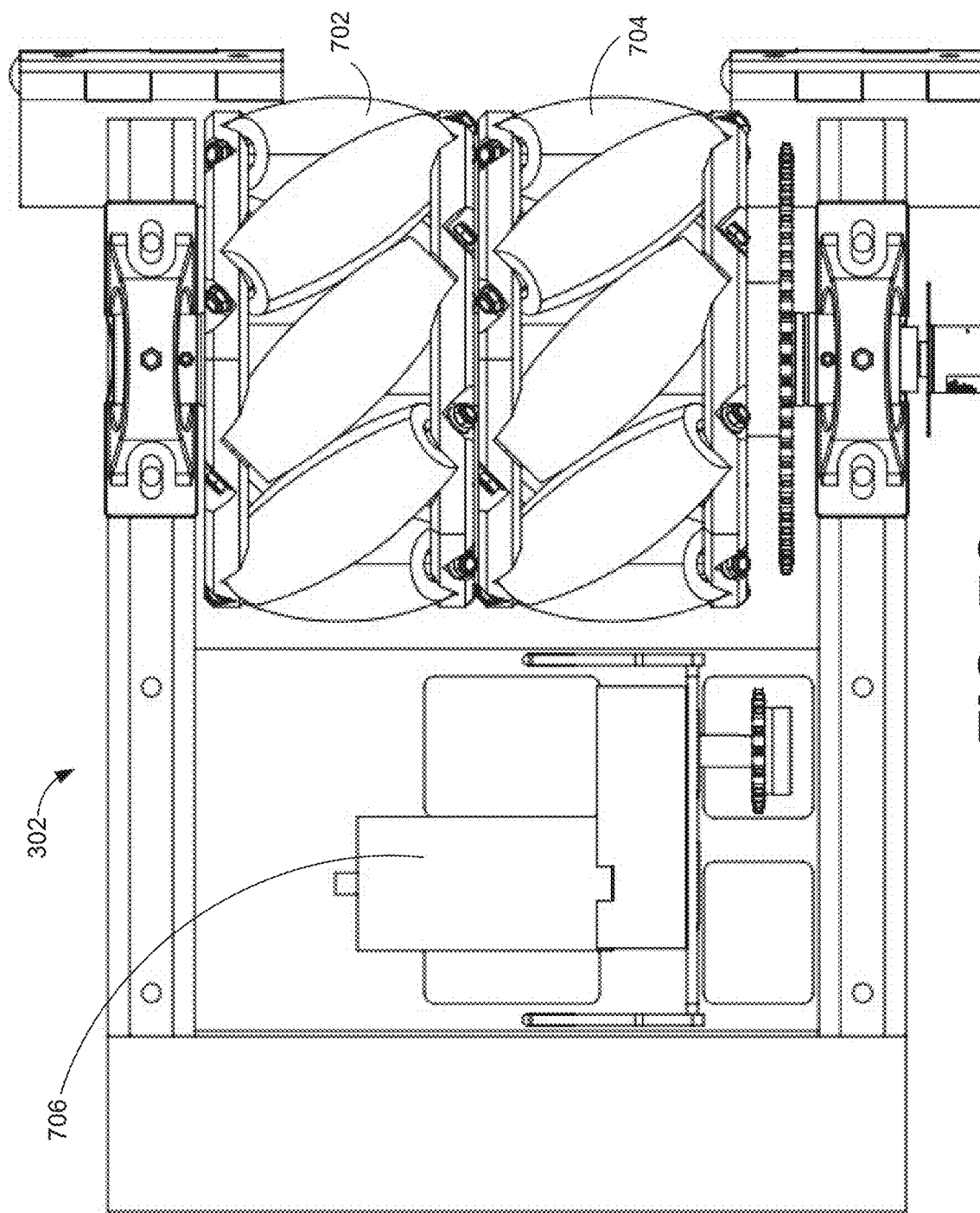
FIG. 7C illustrates a bottom view of an exemplary wheel system of an automated platform, according to one embodiment of the present disclosure.

As shown in FIG. 7C, a bottom view of an exemplary wheel module 302 of an automated platform 100 is shown, according to one embodiment of the present disclosure. In multiple embodiments, the wheel module 302 includes a motor 706. In one or more embodiments, the motor 706 is attached to (or proximate to) the bottom surface 502 such that there is ample ground clearance between the motor 706 and the ground.

Figure 8:
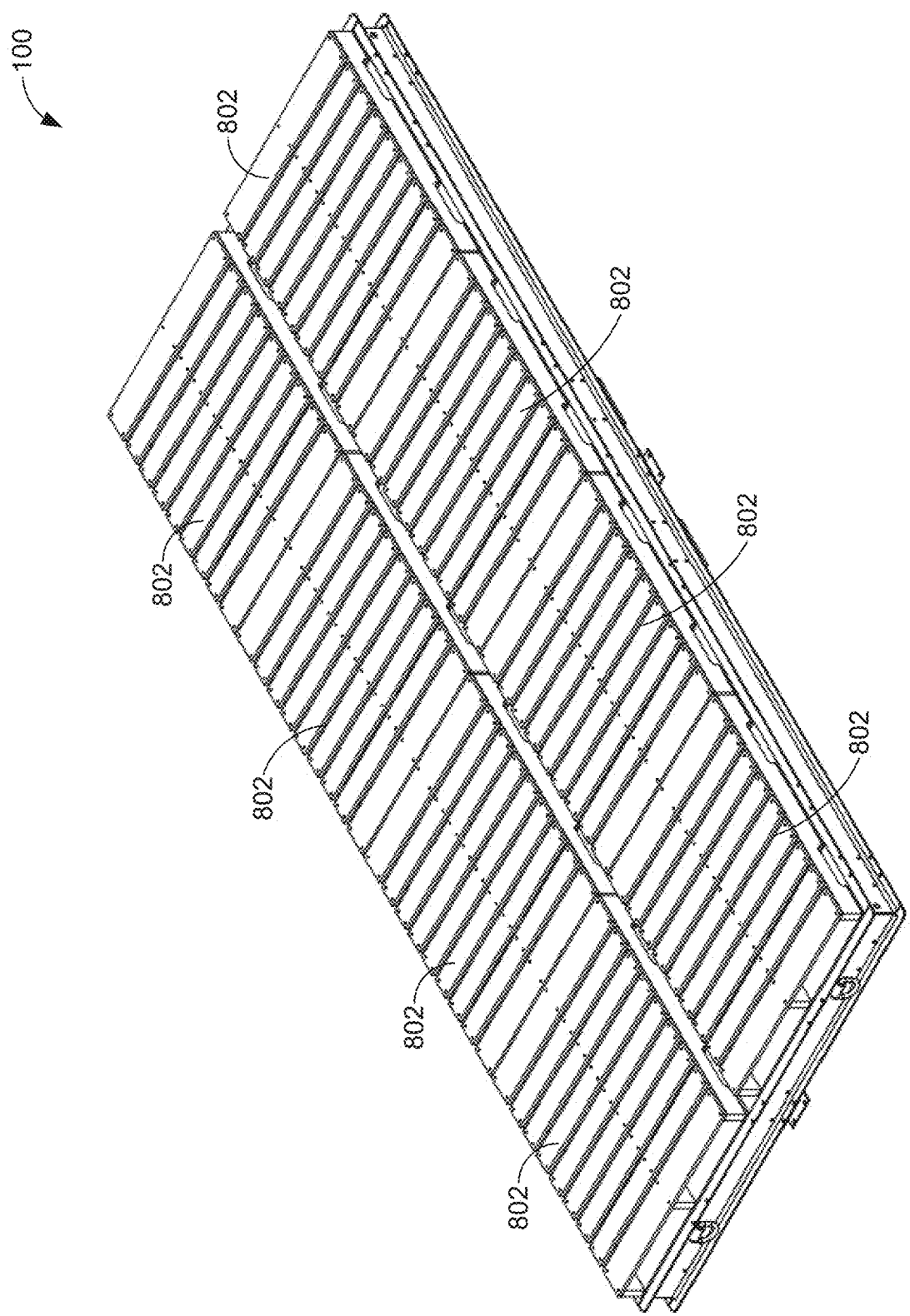
FIG. 8 illustrates a perspective view of an exemplary automated platform, according to one embodiment of the present disclosure.

As shown in FIG. 8, a perspective view of an exemplary automated platform 100 is shown, according to one embodiment of the present disclosure. In various embodiments, the automated platform 100 may hold one or more pallets 802 on top surface 102 of the automated platform 100. In some embodiments, depending on the size of the automated platform 100 and the size of the one or more pallets 802, the automated platform 100 may hold a wide range of one or more pallets 802 (e.g., 1 pallet, 10 pallets, 30 pallets, etc.). In at least one embodiment, the automated platform 100 may hold as many one or more pallets 802 as possible until the maximum weight capacity of the automated platform 100 is reached. For example, in one embodiment, as shown in FIG. 8, an automated platform 100 may hold eight pallets 802.

Figure 9A:
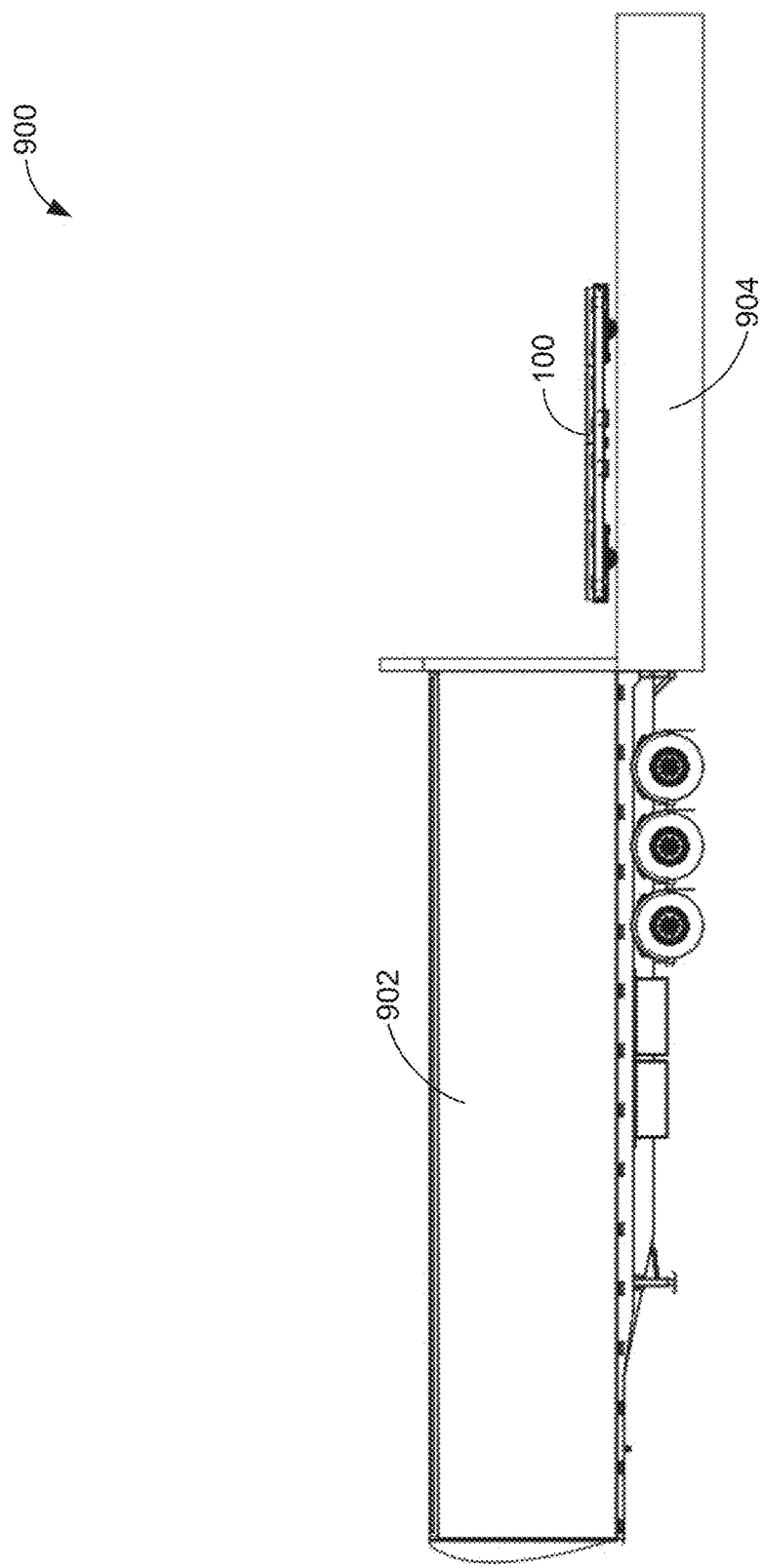
FIG. 9A illustrates a side view of an exemplary automated platform in the process of loading onto a trailer, according to one embodiment of the present disclosure.

As shown in FIG. 9A, a side view 900 of an exemplary automated platform 100 in the process of loading onto a trailer 902 is shown, according to one embodiment of the present disclosure. In several embodiments, the trailer 902 may be at a loading dock 904. In one or more embodiments, the automated platform 100 may detect the trailer 902 and a dock leveler (not shown) if present, and autonomously move towards and into the trailer 902.

Figure 9B:
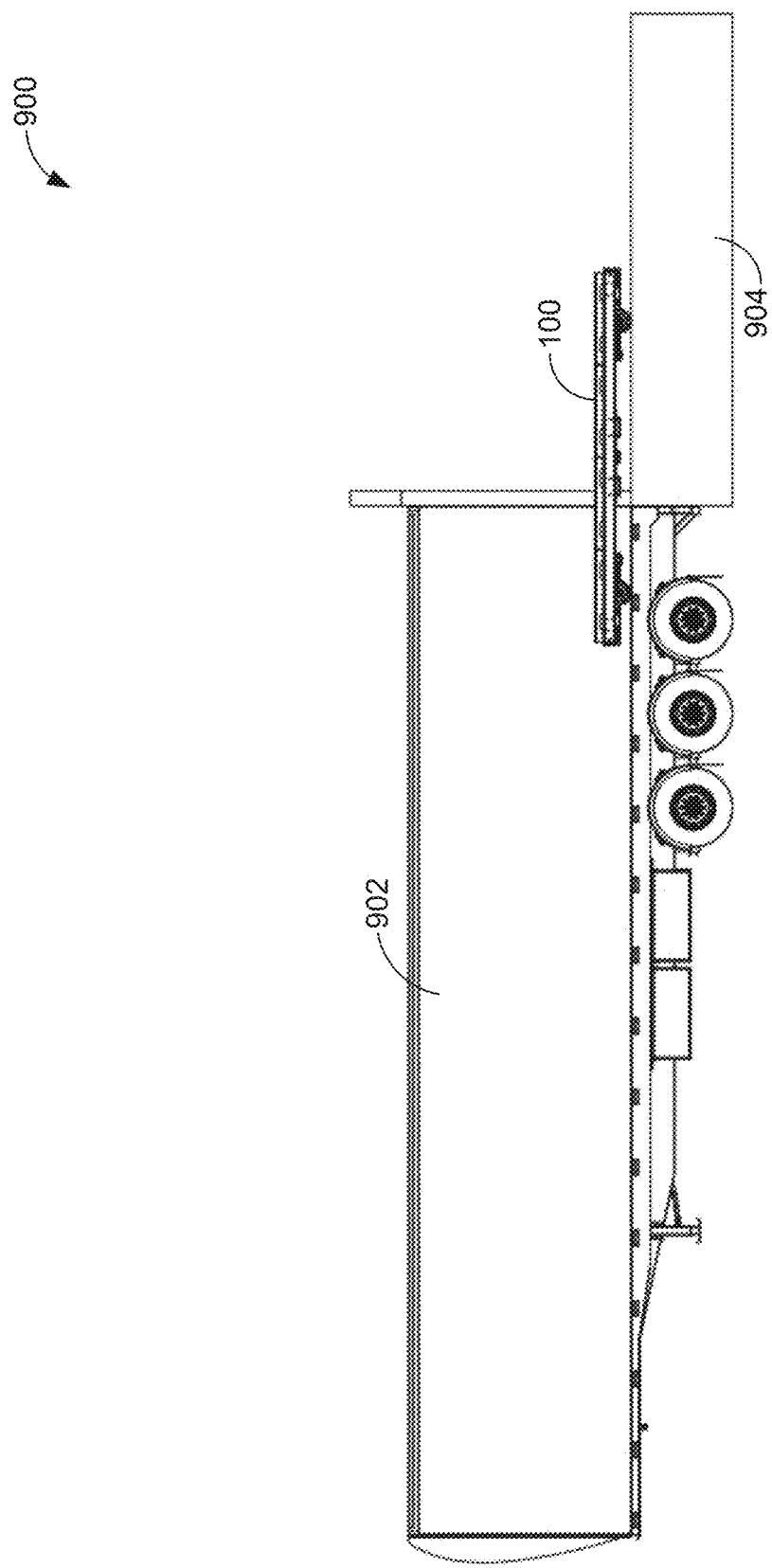
FIG. 9B illustrates a side view of an exemplary automated platform in the process of loading onto a trailer, according to one embodiment of the present disclosure.

As shown in FIG. 9B, a side view 900 of an exemplary automated platform 100 in the process of loading onto a trailer 902 is shown, according to one embodiment of the present disclosure. In many embodiments, as shown in FIG. 9B, the automated platform 100 is about halfway inside the trailer 902 and halfway on the loading dock 904.

Figure 9C:
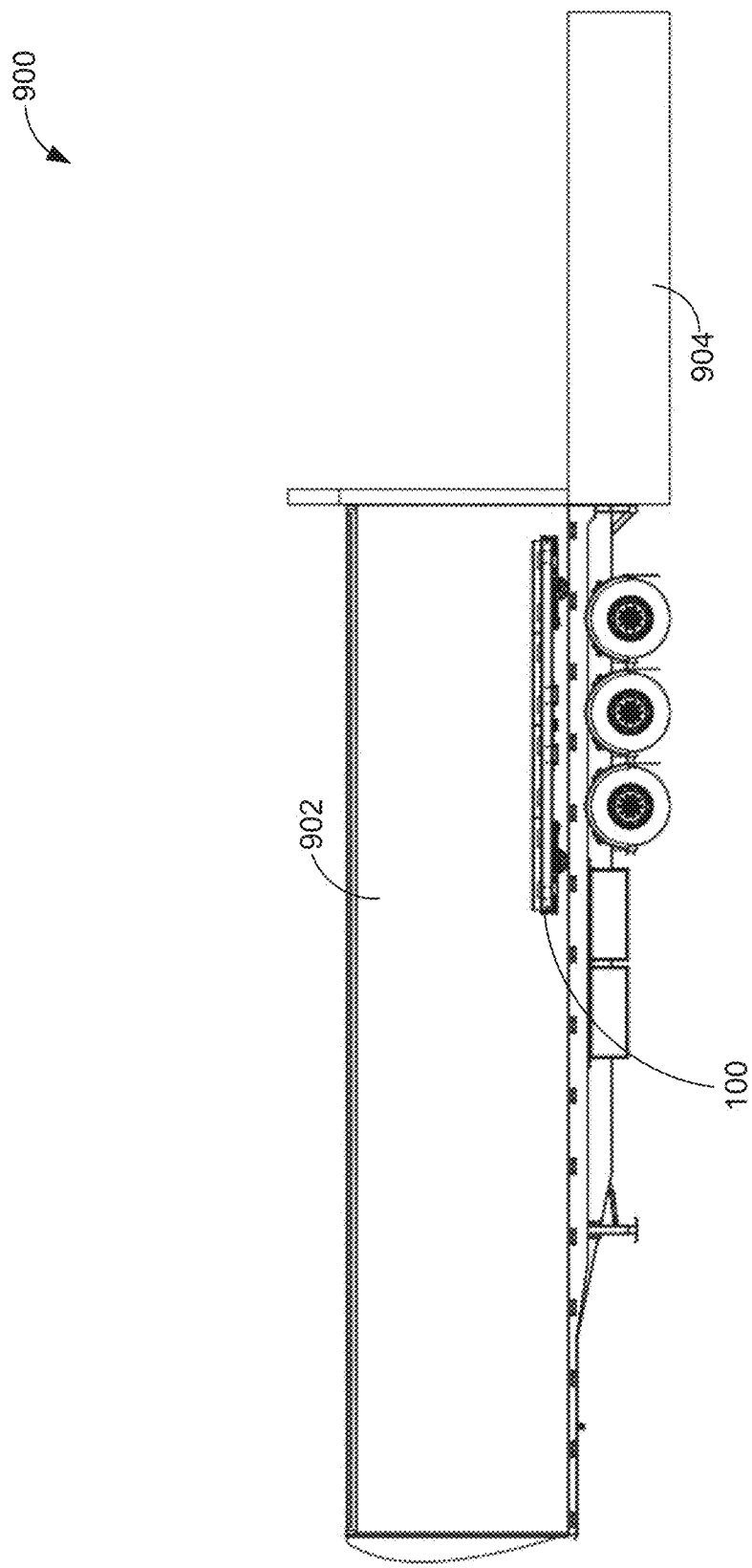
FIG. 9C illustrates a side view of an exemplary automated platform in the process of loading onto a trailer, according to one embodiment of the present disclosure.

As shown in FIG. 9C, a side view 900 of an exemplary automated platform 100 in the process of loading onto a trailer 902, according to one embodiment of the present disclosure. In one or more embodiments, as shown in FIG. 9C, the automated platform 100 is completely inside the trailer 902. In some embodiments, if multiple automated platforms 100 are being loaded into a trailer 100, the multiple automated platforms 100 may utilize the one or more sensors to determine the distance between the automated platforms 100 and the trailer walls and determine the distance between each of the automated platforms 100 so that the multiple automated platforms 100 may be loaded safely and without bumping or hitting the walls of the trailer 902 or the other automated platforms 100.

Figure 10A:
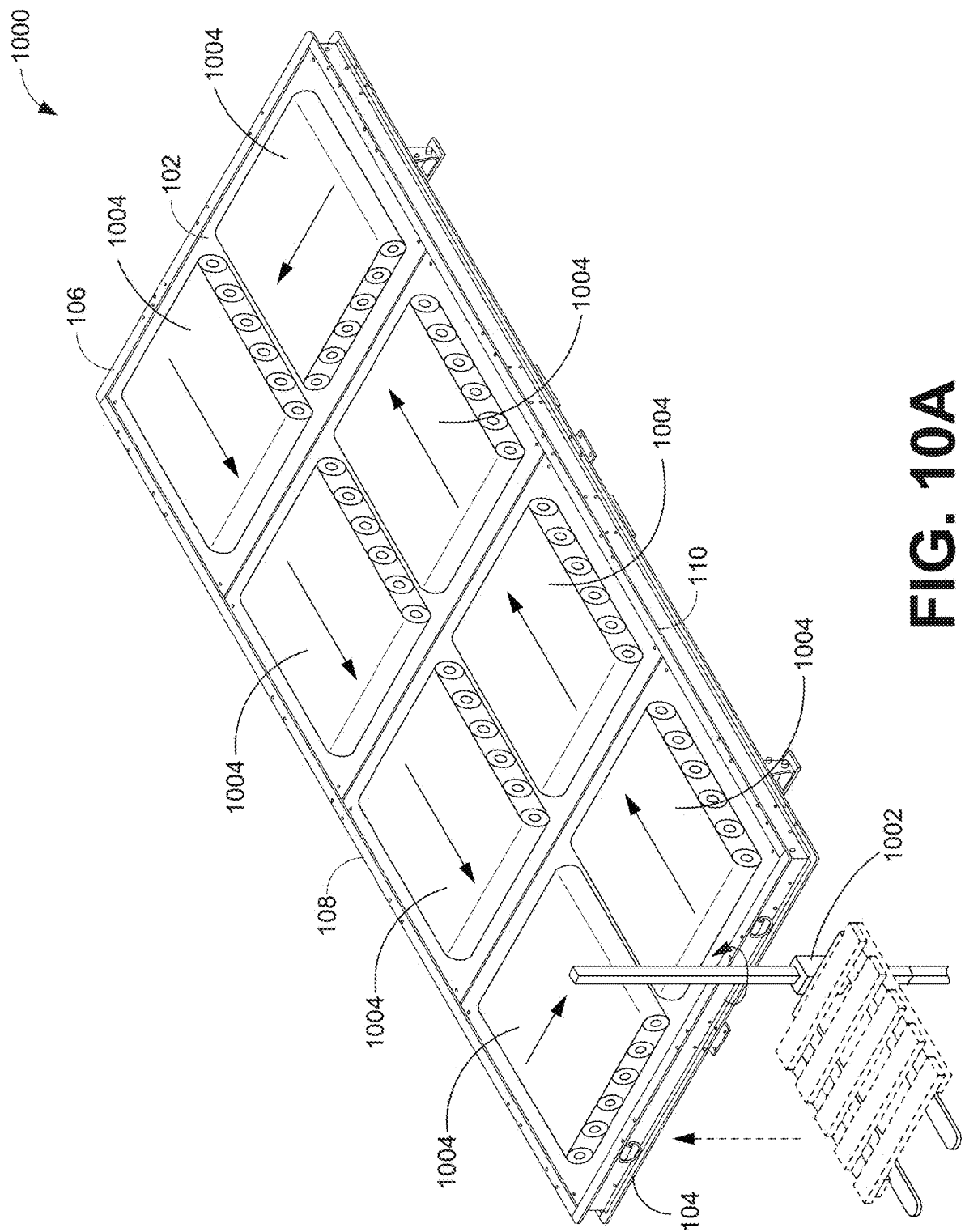
FIG. 10A illustrates a perspective view of an exemplary automated platform, according to one embodiment of the present disclosure.

As shown in FIG. 10A, a perspective view of an exemplary automated platform 1000 is shown, according to one embodiment of the present disclosure. In various embodiments, automated platform 1000 includes the top surface 102, a front side 104, a back side 106, and sides 108 and 110 (e.g., same or similar as automated platform 100). In several embodiments, the automated platform 1000 may also include a forklift 1002 operatively connected to the automated platform 1000 and/or conveyor belts 1004. In some embodiments, as shown in FIG. 10A, the forklift 1002 may be affixed to the perimeter surface. In at least one embodiment, the automated platform 1000 may include a track system (not shown) connected to the perimeter surface so that the forklift 1002 is not operatively connected at a fixed location on the automated platform 1002, but instead is attached to the track system so that the forklift 1002 can move around the perimeter surface of the automated platform 1000.

In multiple embodiments, the forklift 1002 may include components that allow the forklift 1002 to lift a pallet onto the automated platform 1000. In some embodiments, the components of the forklift 1002 may include forks, a support structure for guiding and supporting the forks during the lifting process, and a power system to provide the forklift 1002 with power to lift the pallet (e.g., a hydraulic system, motor system, etc.).

In several embodiments, the automated platform 1000 may utilize one or more sensors (e.g., 3D cameras, LIDAR, etc.) to maneuver the automated platform 1000 so that the forks of the forklift 1002 enter underneath a pallet. In one or more embodiments, the automated platform 1002 may determine, via one or more sensors that the forks of the forklift 1002 are properly placed underneath a pallet before lifting the pallet. In some embodiments, as the forklift 1002 lifts the pallet over the top surface 102 of the automated platform 1000, the forks rotate 180 degrees so that the pallet is directly over the automated platform 1000.

In various embodiments, the automated platform 1000 may also include conveyor belts 1004 affixed or operatively connected to the top surface 102. In many embodiments, as shown in FIG. 10A, the conveyor belts 1004 may be a series of separated conveyor belts 1004 that can move a pallet to a particular location on the automated platform 1000. In some embodiments, the conveyor belts 1004 may be programmed to only move in one direction (as shown by the arrows on each of the conveyor belts 1004 in FIGS. 10A and 10B), or the conveyor belts 1004 may be able to switch direction of movement in any direction (e.g., forward, backwards, sideways). In other embodiments, the conveyor belt 1004 may be a continuous, singular conveyor belt 1004.

Figure 10B:
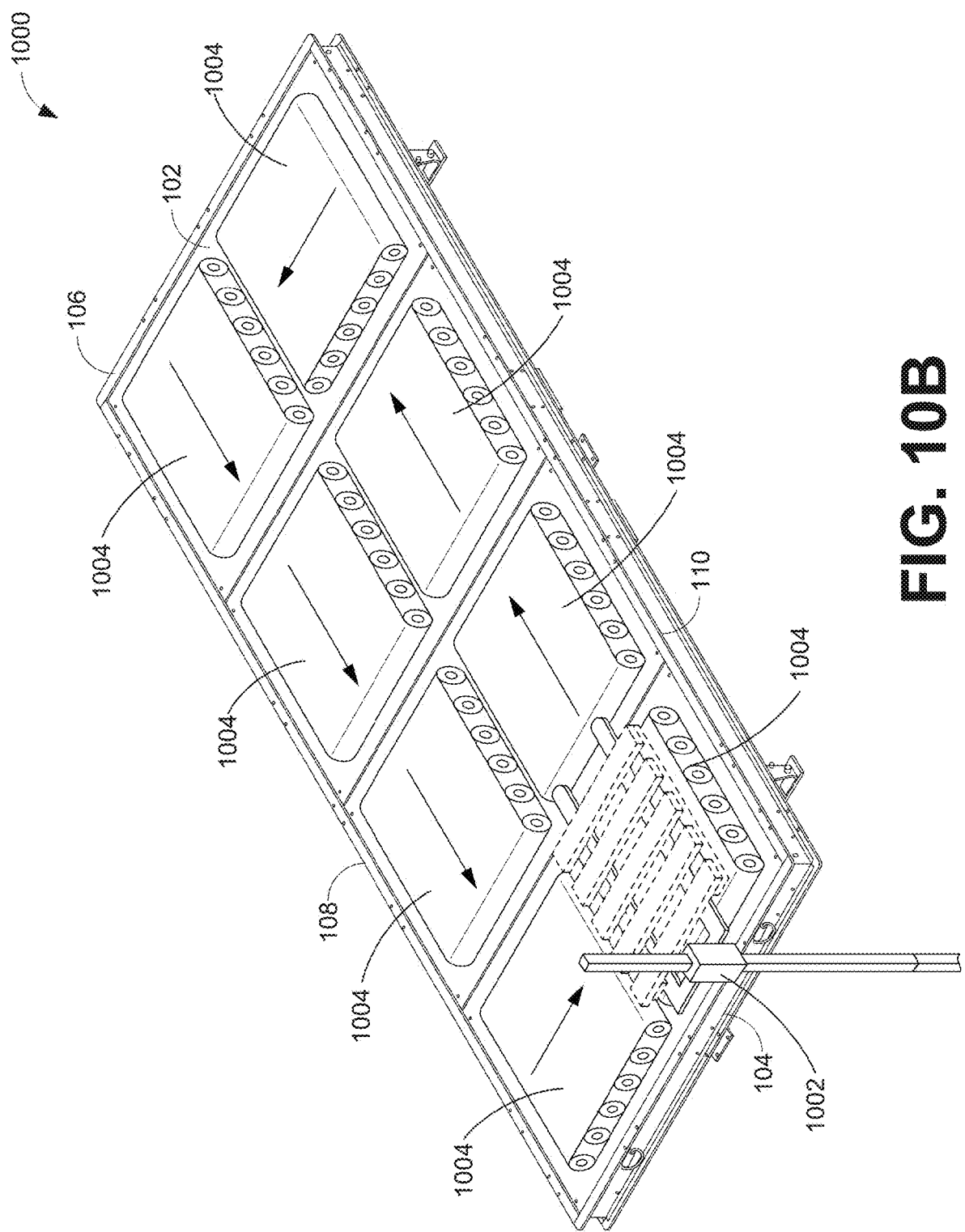
FIG. 10B illustrates a perspective view of an exemplary automated platform, according to one embodiment of the present disclosure.

In many embodiments, the conveyor belts 1004 (as shown in FIGS. 10A and 10B) may be individually powered on or off to move a loaded pallet to a certain location on the automated platform 1000. In some embodiments, the automated platform 1000 may receive a pallet at a designated conveyor belt 1004 and cause the pallet to be moved to a certain location. In one or more embodiments, the automated platform 1000 may utilize the weight sensors in the wheel module 302 to determine if a pallet has been moved to the certain location. In at least one embodiment, the automated platform 1000 may utilize patterns to load pallets onto the conveyor belts 1004. For example, in one embodiment, as shown in FIGS. 10A and 10B, a pallet may be loaded onto a first conveyor belt 1004, and the automated platform may cause the pallet to be moved via the conveyor belts 1004 in a circular pattern. In certain embodiments, the automated platform 1000 may utilize weight sensing to move pallets around the conveyor belts 1004 so that the weight of the pallets is distributed evenly across the automated platform 1000. In at least one embodiment, when the forklift 1002 has loaded the last pallet onto the conveyor belts 1004, if the automated platform 1000 is fully loaded (e.g., maximum amount of pallets loaded onto the automated platform 1000), the automated platform 1000 may not cause the conveyor belts 1004 to move, so that the last pallet stays on the forks of the forklift 1002.

In several embodiments, to unload the automated platform 1000, the automated platform 1000 may cause the conveyor belts 1004 to maneuver the pallets in such a way that the pallets are moved onto the forks of the forklift 1002. In some embodiments, the automated platform 1000 may cause the conveyor belts 1004 to move in the opposite direction from the loading process, so that the pallets may be maneuvered onto the forks of the forklift 1002.

As shown in FIG. 10B, a perspective view of an exemplary automated platform 1000 is shown, according to one embodiment of the present disclosure. In multiple embodiments, as shown in FIG. 10B, the forklift 1002 has lifted a pallet from the ground, rotated 180 degrees, and placed the pallet on a first conveyor belt 1004.

Figure 11A:
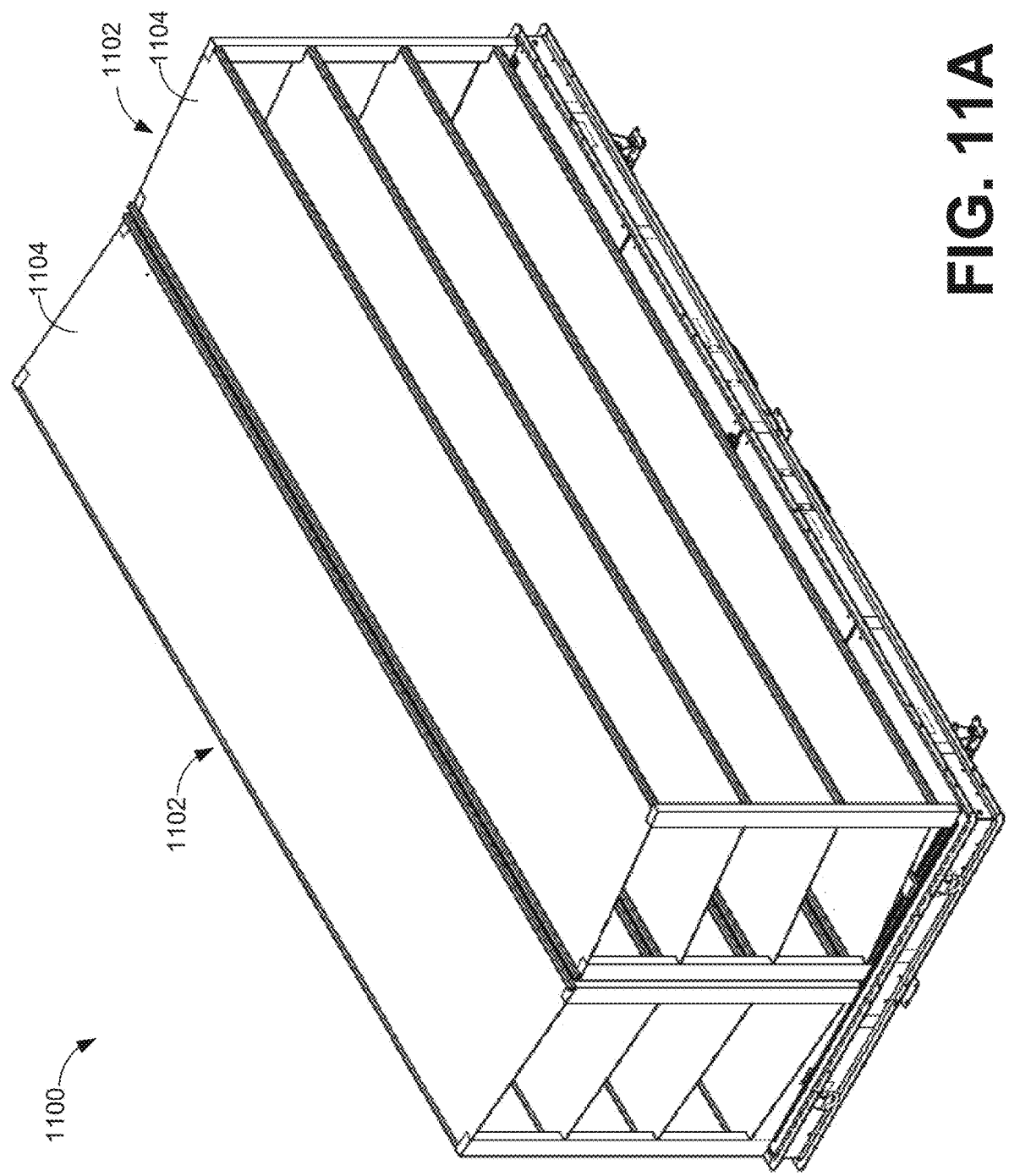
FIG. 11A illustrates a perspective view of an exemplary automated platform, according to one embodiment of the present disclosure.

As shown in FIG. 11A, a perspective view of an exemplary automated platform 1100 is shown, according to one embodiment of the present disclosure. In various embodiments, the automated platform 1100 may include some or all of the components of automated platform 100, and additionally include one or more shelving units 1102 and a central portion. In one or more embodiments, the central portion of the automated platform 1100 may be defined as an area about halfway across the width of the automated platform 1100. In certain embodiments, the central portion of the automated platform 1100 may be the same or substantially similar to the central walking aisle 1106 (see FIG. 11B). In one embodiment, the one or more shelving units 1102 may include one or more shelves 1104. In some embodiments, automated platform 1100 may be utilized in trailers or package delivery vehicles (e.g., local delivery vans, large delivery trailers, etc. that are utilized by mail carriers such as UPS, FedEx, Amazon, etc.). In at least one embodiment, the shelving units 1102, in a first position (e.g., unactuated state), are within the boundaries of the platform surface such that the shelving units 1102 or a portion of each of the shelving units 1102 are located at the central portion of the automated platform 1100. In one embodiment, as shown in FIG. 11A, the shelving units 1102 are in the first position.

In one or more embodiments, the shelving units 1102 may be loaded with various goods and/or parcels, and automated platform 1100 may move into a package delivery vehicle via a rear door (e.g., in the same process as described herein for automated platform 100 moving inside a trailer). In many embodiments, once the automated platform 1100 is inside the package delivery vehicle, the automated platform 1100 may cause the shelving units 1102 to actuate out (e.g., translate towards) to the side walls of the package delivery vehicle to a second position, forming a central walking aisle 1106 (see FIG. 11B). In several embodiments, the automated platform 1100, via an actuating system, may cause the shelving units to translate from the first position away from the central portion of the automated platform 1100 to the second position. In some embodiments, the actuating system may be a hydraulic system, a motor unit, a spring system, or any other type of system that may cause the shelving units 1102 to move towards the side walls of the package delivery vehicle.

In certain embodiments, the automated platform 1100 may include tracks 1108 to guide the shelving units 1102 as the shelving units 1102 are moved towards the side walls of the package delivery vehicle. In many embodiments, once the shelving units 1102 are extended to the side walls of the package delivery vehicle (e.g., the shelving units 1102 are at the second position), each shelving unit 1102 may be locked into place by a locking mechanism. In one embodiment, the locking mechanism may be a mechanical system that provides assistance to the coupling and uncoupling of the each shelving unit 1102 to the package delivery vehicle and fixing in place the shelving units 1102 when in operation. In one or more embodiments, the locking mechanisms may be located on the side walls or floor or ceiling of the package delivery vehicle. In at least one embodiment, the locking mechanisms may be a magnetic system (e.g., a magnet on the wall and a magnet on a shelving unit 1102) such that the automated platform 1102 may cause the magnet on the shelving units 1102 to be active or inactive (e.g., when active, the magnets on the shelving units 1102 and on the walls pull towards each other, locking the shelving units 1102 in place).

Figure 11B:
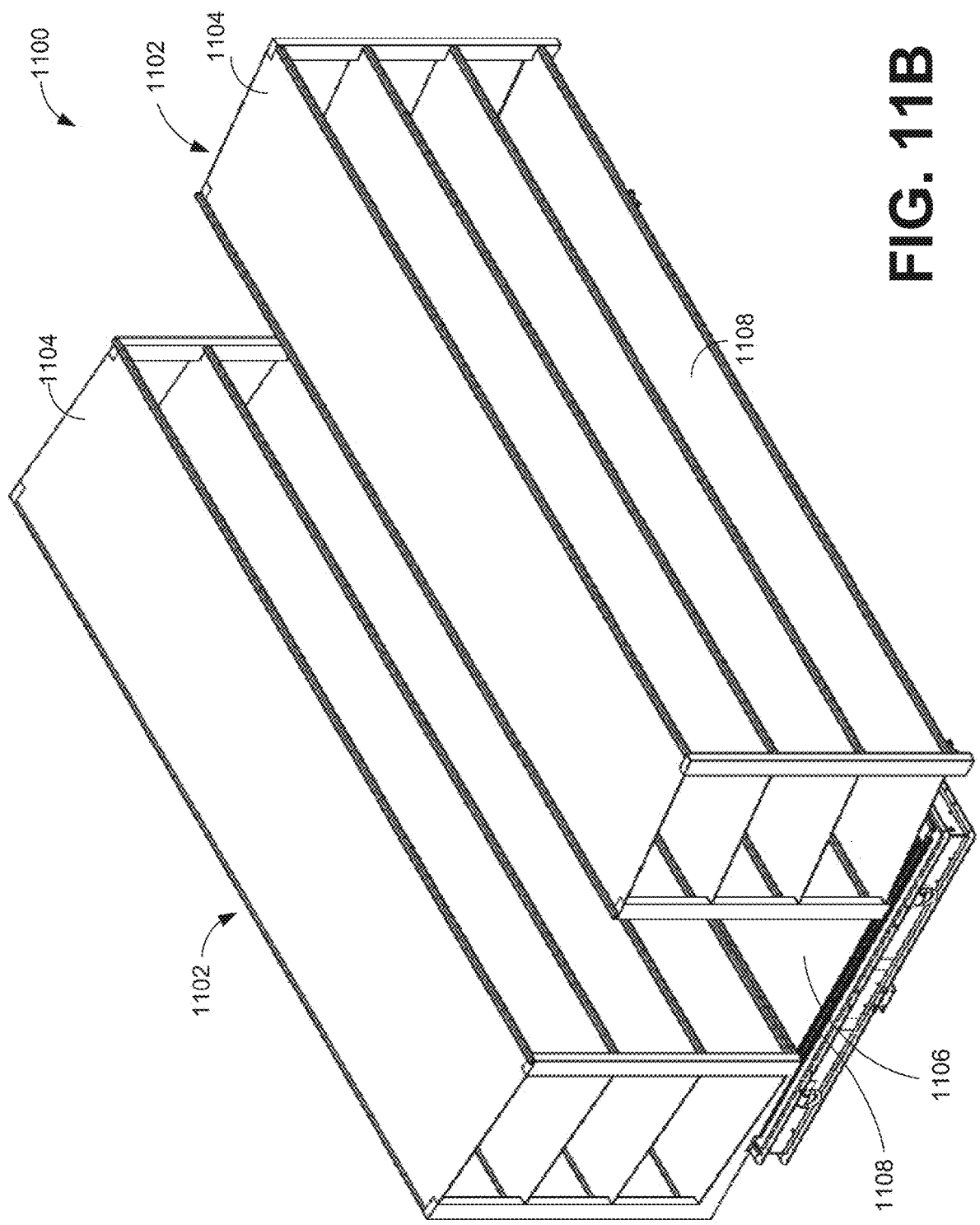
FIG. 11B illustrates a perspective view of an exemplary automated platform, according to one embodiment of the present disclosure.

As shown in FIG. 11B, a perspective view of an exemplary automated platform 1100 is shown, according to one embodiment of the present disclosure. In one embodiment, as shown in FIG. 11B, the shelving units 1102 are in the second position. In several embodiments, the automated platform 1100 has caused the shelving units 1102 to translate out (e.g., extend outwardly from the central portion) such that the central walking aisle 1106 is formed. In many embodiments, when the automated platform 1100 receives a command to unload, the automated platform 1100 may cause the locking mechanism to unlock, cause the shelving units 1102 to translate from the second position towards the central portion of the automated platform 1100 (e.g., the first position), and move out of the package delivery vehicle. In one embodiment, the automated platform 1100 may utilize one or more sensors as described herein to detect obstacles and to calculate a travel path.

In multiple embodiments, the automated platform 1100 may be sized such that the width, length, and height of the automated platform 1100 may fit inside the rear door of a package delivery vehicle. For example, in one or more embodiments, an automated platform 1100 with shelving units 1102 may be loaded with parcels or goods, and when the package delivery vehicle is at the loading dock, the automated platform 1100 may move from the loading dock into the rear access of the package delivery vehicle. In some embodiments, the automated platform 1100 may move up or down a ramp or dock leveler to move inside or out of the package delivery vehicle. In one embodiment, the automated platform 1100 and the shelving units 1102 may have a combined height between 2 feet and 15 feet (e.g., 5 feet, 7 feet, or 12 feet). In many embodiments, the width of an automated platform 1100 in the first position (e.g., shelving units 1102 have not been actuated outwards) may be within between 2 and 8.5 feet (e.g., 2 feet, 4 feet, 5 feet, 8.5 feet, etc.). In at least on embodiment, the shelving units 1102 in the second position may be up to 12 feet apart (e.g., if the trailer walls are 12 feet apart, the shelving units 1102 may translate so that each shelving unit 1102 is proximate to opposing trailer walls).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. An electronic, movable platform, comprising:
a generally planar platform member having an upper surface, a lower surface, and a perimeter surface that is affixed to and extends downwardly from the lower surface;
a plurality of omni-directional wheel modules affixed to the lower surface of the generally planar platform member, wherein the plurality of omni-directional wheel modules extend only partially beyond a lower-most edge of the perimeter surface;
a motor affixed to the generally planar platform member;
a control system operatively connected to the plurality of omni-directional wheel modules and the motor, wherein the control system provides instructions to the plurality of omni-directional wheel modules and the motor causes the generally planar platform member to move;
two or more shelving units affixed to the upper surface of the generally planar platform member; and
an actuator system operatively connected to the two or more shelving units, wherein the actuator system causes the two or more shelving units to translate from a first position away from a central portion of the generally planar platform member to a second position.

2. The platform of claim 1, wherein the two or more shelving units form a central aisle at the central portion of the generally planar platform member in the second position.

3. The platform of claim 2, further comprising tracks affixed onto the upper surface of the generally planar platform member for guiding the two or more shelving units from the first position to the second position.

4. The platform of claim 3, further comprising a locking mechanism on each of the two or more shelving units, wherein the locking mechanism locks each of the two or more shelving units in the second position.

5. The platform of claim 1, further comprising a plurality of hydraulic legs affixed to the lower surface of the generally planar platform member, wherein the plurality of hydraulic legs is operatively connected to the control system.

6. The platform of claim 5, wherein each of the plurality of hydraulic legs, when so instructed by the control system, extends downwardly in a hinge-like manner to contact an underlying surface supporting the platform and station the platform thereon.

7. The platform of claim 1, further comprising one or more sensors operatively connected to the control system and configured to detect physical objects in relative proximity to the platform.

8. The platform of claim 7, wherein the control system includes software configured to autonomously drive the platform based on readings received from the one or more sensors.

9. The platform of claim 1, further comprising a controller maintained at a distance physically separate from the platform and operable to transmit instructions to the control system to control movement of the platform.

10. The platform of claim 1, further comprising:
a location tracking system embedded on or within the platform and operable to track a physical location of the platform; and
a local mesh network operatively connected to the control system, wherein the local mesh network enables monitoring of locations of a plurality of platforms in a physical environment.

11. The platform of claim 1, wherein the upper surface of the generally planar platform member is specifically sized to accommodate no more than eight pallets to be loaded thereon, wherein the eight pallets are distributed evenly across the upper surface.

12. The platform of claim 1, wherein each of the plurality of omni-directional wheel modules includes one or more omni-directional wheels.

13. The platform of claim 1, further comprising:
a forklift affixed to the perimeter surface; and
one or more conveyor belts affixed to the upper surface of the generally planar platform member.

14. An electronic, autonomous, movable platform, comprising:
a rectangular planar platform member having an upper surface, a lower surface, and a perimeter skirt that is affixed to and extends downwardly from the lower surface;
a plurality of omni-directional wheel modules affixed to the lower surface of the rectangular planar platform member, wherein the plurality of omni-directional wheel modules extends only partially beyond a lowermost edge of the perimeter skirt;
a motor affixed to the rectangular planar platform member;
a control system operatively connected to the plurality of omni-directional wheel modules and the motor, the control system including an autonomous driving module that is configured to drive the rectangular planar platform member without instructions from a manual control, wherein the autonomous driving module provides instructions to the plurality of omni-directional wheel modules and the motor causes the rectangular planar platform member to move autonomously;
two or more shelving units affixed to the upper surface of the rectangular planar platform member; and
an actuator system operatively connected to the two or more shelving units, wherein the actuator system causes the two or more shelving units to translate from a first position away from a central portion of the rectangular planar platform member to a second position.

15. The platform of claim 14, further comprising a plurality of hydraulic legs affixed to the rectangular planar platform member, wherein the plurality of hydraulic legs is operatively connected to the control system and is maintained within a boundary of the perimeter skirt when in a retracted position.

16. The platform of claim 15, wherein each of the plurality of hydraulic legs, when so instructed by the control system, extends downwardly in a hinge-like manner outside of the boundary of the perimeter skirt to contact an underlying surface supporting the platform and station the platform thereon.

17. The platform of claim 14, further comprising one or more sensors operatively connected to the control system and configured to detect physical objects in relative proximity to the platform.

18. The platform of claim 17, wherein the autonomous driving module is configured to autonomously drive the platform based on readings received from the one or more sensors.

19. The platform of claim 14, further comprising a controller maintained at a distance physically separate from the platform and operable to transmit instructions to the control system to control movement of the platform when the platform is not in an autonomous driving mode.

20. The platform of claim 14, further comprising:
a location tracking system embedded on or within the platform and operable to track a physical location of the platform; and
a local mesh network operatively connected to the control system, wherein the local mesh network enables monitoring of locations of a plurality of platforms in a physical environment.

21. The platform of claim 14, wherein the upper surface of the rectangular planar platform member is specifically sized to accommodate no more than eight pallets to be loaded thereon, wherein the eight pallets are distributed evenly across the upper surface.

22. The platform of claim 14, wherein each of the plurality of omni-directional wheel modules includes one or more omni-directional wheels.

23. The platform of claim 14, further comprising:
a forklift affixed to the perimeter skirt; and
one or more conveyor belts affixed to the upper surface of the rectangular planar platform member.

* * * * *